US 9,235,251 B2

(12) United States Patent
Gargash et al.

(10) Patent No.: US 9,235,251 B2
(45) Date of Patent: Jan. 12, 2016

(54) DYNAMIC LOW POWER MODE IMPLEMENTATION FOR COMPUTING DEVICES

(75) Inventors: Norman S. Gargash, Boulder, CO (US); Andrew J. Frantz, Boulder, CO (US); Brian J. Salsbery, Boulder, CO (US); Christopher A. Barrett, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 12/965,008

(22) Filed: Dec. 10, 2010

(65) Prior Publication Data

US 2011/0173474 A1 Jul. 14, 2011

Related U.S. Application Data

(60) Provisional application No. 61/294,055, filed on Jan. 11, 2010.

(51) Int. Cl.
*G06F 1/32* (2006.01)
*G06F 1/20* (2006.01)

(52) U.S. Cl.
CPC ............ *G06F 1/3203* (2013.01); *G06F 1/206* (2013.01); *G06F 1/324* (2013.01); *G06F 1/325* (2013.01);
(Continued)

(58) Field of Classification Search
CPC ......... G06F 1/206; G06F 1/26; G06F 1/3203; G06F 1/324; G06F 1/3243; G06F 1/325; G06F 1/3287; Y02B 60/32; Y02B 60/1217; Y02B 60/1239; Y02B 60/1282
USPC .................. 713/300, 310, 320–324, 330, 340
See application file for complete search history.

(56) References Cited

U.S. PATENT DOCUMENTS 6,457,135 B1 9/2002 Cooper
RE38,108 E 5/2003 Chee
(Continued)

FOREIGN PATENT DOCUMENTS

CN 1658127 A 8/2005
CN 101120298 A 2/2008
(Continued)

OTHER PUBLICATIONS

Krogh B H et al., "Hierarchical Adaptive Dynamic Power Management", IEEE Transactions on Computers, IEEE Service Center, Los Alamitos, CA, US, vol. 54, No. 4, Apr. 1, 2005, pp. 409-420, XP011127489, ISSN: 0018-9340, DOI:10.1109/TC.2005.66.
(Continued)

*Primary Examiner* — Fahmida Rahman
(74) *Attorney, Agent, or Firm* — Nicholas A. Cole

(57) ABSTRACT

The aspects enable a computing device or microprocessor to determine a low power mode that provides the most system power savings by placing selected resources in a low power mode while continuing to function reliably, depending upon the resources not in use, acceptable system latencies, dynamic operating conditions (e.g., temperature), expected idle time, and the unique electrical characteristics of the particular device. Aspects provide a mechanism for determining an optimal low power configuration made up of a set of low power modes for the various resources within the computing device by determining which low power modes are valid at the time the processor enters an idle state, ranking the valid low power modes by expected power savings given the current device conditions, determining which valid low power mode provides the greatest power savings while meeting the latency requirements, and selecting a particular low power mode for each resource to enter.

56 Claims, 14 Drawing Sheets

(52) U.S. Cl.
CPC ............ G06F 1/3243 (2013.01); G06F 1/3287 (2013.01); Y02B 60/1217 (2013.01); Y02B 60/1239 (2013.01); Y02B 60/1282 (2013.01); Y02B 60/32 (2013.01)

(56) References Cited

U.S. PATENT DOCUMENTS

| | | |
|---|---|---|
| 7,246,181 B2 | 7/2007 | Rosing |
| 7,360,106 B2 | 4/2008 | Kato |
| 7,366,921 B2 | 4/2008 | Ranganathan |
| 7,386,747 B2 | 6/2008 | Dockser |
| 7,454,631 B1 | 11/2008 | Laudon et al. |
| 7,529,956 B2 | 5/2009 | Stufflebeam |
| 7,539,885 B2 | 5/2009 | Ma |
| 7,647,078 B2 | 1/2010 | Kim |
| 7,716,506 B1 | 5/2010 | Surgutchik et al. |
| 7,752,468 B2 | 7/2010 | Dodeja |
| 7,783,905 B2 | 8/2010 | Chang |
| 8,332,675 B2 * | 12/2012 | Kwa et al. ............ 713/320 |
| 8,341,628 B2 | 12/2012 | Arndt et al. |
| 2003/0028711 A1 | 2/2003 | Woo et al. |
| 2004/0002823 A1 | 1/2004 | Aldridge et al. |
| 2004/0123172 A1 | 6/2004 | Sheller |
| 2004/0128567 A1 * | 7/2004 | Stewart ............ 713/300 |
| 2005/0071698 A1 | 3/2005 | Kangas |
| 2005/0181840 A1 * | 8/2005 | Banginwar et al. ........ 455/574 |
| 2005/0210312 A1 | 9/2005 | Maruichi et al. |
| 2006/0282826 A1 | 12/2006 | Dockser |
| 2008/0028240 A1 | 1/2008 | Arai |
| 2009/0172434 A1 | 7/2009 | Kwa et al. |
| 2009/0249103 A1 | 10/2009 | Jeyaseelan et al. |
| 2009/0299543 A1 | 12/2009 | Cox |
| 2009/0327784 A1 | 12/2009 | Shah |
| 2010/0019837 A1 | 1/2010 | Rozen |
| 2010/0162256 A1 | 6/2010 | Branover |
| 2010/0169680 A1 * | 7/2010 | Struik ............ 713/320 |
| 2010/0169684 A1 | 7/2010 | Jeyaseelan et al. |
| 2010/0169685 A1 | 7/2010 | Gough |
| 2010/0287394 A1 | 11/2010 | Branover et al. |
| 2011/0173475 A1 | 7/2011 | Frantz et al. |
| 2012/0324265 A1 | 12/2012 | Jeyaseelan et al. |
| 2013/0007492 A1 | 1/2013 | Sokol, Jr. et al. |
| 2013/0073884 A1 | 3/2013 | Ulmer et al. |
| 2013/0111242 A1 | 5/2013 | Heller et al. |
| 2013/0262899 A1 | 10/2013 | Frantz et al. |
| 2013/0290758 A1 | 10/2013 | Quick et al. |

FOREIGN PATENT DOCUMENTS

| | | |
|---|---|---|
| GB | 2421325 A | 6/2006 |
| JP | H10268987 A | 10/1998 |
| JP | 2002244761 A | 8/2002 |
| JP | 2002258997 A | 9/2002 |
| JP | 2004192256 A | 7/2004 |
| JP | 2005234826 A | 9/2005 |
| JP | 2006163643 A | 6/2006 |
| JP | 2006254185 A | 9/2006 |
| JP | 2007042090 A | 2/2007 |
| JP | 2008507762 A | 3/2008 |
| JP | 2008141290 A | 6/2008 |
| JP | 2010009581 A | 1/2010 |
| WO | WO2006088167 A2 | 8/2006 |
| WO | WO2006138687 A2 | 12/2006 |

OTHER PUBLICATIONS

Eui-Young Chung et al: "Dynamic power management using adaptive learning tree", 1999 IEEE/ACM International Conference on Computer-Aided Design. Digest of Technical Papers (CAT. No. 99CH37051) IEEE Piscataway, NJ, USA, 1999, pp. 274-279, XP002633691, ISBN: 0-7803-5832.

International Search Report and Written Opinion—PCT/US2011/020710—ISA/EPO—May 23, 2011.

Li F et al. "Compiler-directed proactive power management for networks", CASES '05 Proceedings of the 2005 International Conference on Compilers, Architectures and Synthesis for Embedded Systems Sep. 2005, pp. 137-146, XP002633690, Retrieved from the Internet: URL:http://delivery.aem.org/10.1145/109000 0/1086316/p137-li.pdf?keyl=1086316&key2=70   30223031&coll=DL&di=ACM&ip=145.64.134.245&CFID=18692350&CFTOKEN=76191485>.

Huiling W., et al., "Circuit Fundamentals," Higher Education Press, pp. 1-7.

* cited by examiner

DYNAMIC LOW POWER MODE IMPLEMENTATION FOR COMPUTING DEVICES

RELATED APPLICATIONS

This application claims the benefit of priority to U.S. Provisional Patent Application No. 61/294,055 filed Jan. 11, 2010 entitled "Dynamic Low Power Mode Implementation For Computing Devices," the entire contents of which are hereby incorporated by reference.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. Battery life is a key driver of mobile electronic devices so methods and devices which enable conservation of battery power are important considerations in electronic device technologies.

SUMMARY

The various aspects provide data and methods that may be used or implemented by a processor within a computing device to select a combination of optimal, or near optimum, low power operating modes for resources of the computing device. The various aspects allow resource components to have two or more resource power modes and the processor to select a power mode for each of the various resources based on operating state, operating conditions, sleep cycle characteristics and other factors to dynamically configure a system low power mode at the time the processor enters a low power or sleep state. The various aspects allow a processor to evaluate the low power modes of various resources, and any combination of resource low power modes, to identify those resources or combinations of resources whose effective latency would not exceed the overall system latency requirements of all active tasks. The various aspects allow a processor select a combination of resource low power modes to implement in a system low power configuration that maximizes power savings while meeting the overall system latency requirements of all active tasks, and to make this selection dynamically (i.e., at the time of a sleep cycle), instead of selecting from a set of predefined low power configurations. The various aspects enable a processor to continually re-compute lookup tables used by a solver process to determine an optimum low power configuration optimized to the current conditions and operating state. The various aspects enable a processor to make use of statistical information regarding the operation of the computing device to determine an optimum low power configuration suitable for a current state, active devices and applications, and expected sleep duration. The various aspects enable a processor to select an optimum low power configuration based on current and past environmental and usage information.

The various aspects include methods for conserving power in a computing device that includes setting a flag bit associated with a resource when the resource is not in use, wherein the resource is one of a plurality of resources, identifying the resources that may be placed in a low power mode based upon flag bit settings when a processor is able to enter an idle state, registering a latency requirement for each of the identified resources, selecting a most stringent latency requirement from the registered latency requirements, evaluating on the computing device low power modes for each resource that may be placed in a low power mode to eliminate any low power resource mode, or any combination of low power resource modes, that have a combined latency requirement that exceeds the selected most stringent latency tolerance, selecting a combination of low power resource modes that maximizes potential power savings and has a total latency requirement that is less than or equal to the selected worst case latency requirement, and entering the selected combination of low power resource modes by executing an enter function of each of the selected low power modes on each of the identified resources. In the aspect methods, selecting a combination of low power resource modes may include executing a knapsack problem solution algorithm for the various low power modes and resources. The aspect methods may further include determining a time that the processor is expected to remain in an idle state, and determining the potential power savings of each evaluated low power resource modes based upon a potential power savings per unit time at a current temperature times the determined expected idle time. The aspect methods may further include measuring, when the device is in a known stable state, temperature and current, or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode, in which selecting a combination of low power resource modes that maximizes potential power savings includes using the measured current or power demand associated with each low power resource mode to determine potential power savings of a combination of low power resource modes. The aspect methods may further include repeating the operations at different temperatures, and determining a temperature sensitivity of current or power demand associated with each low power resource mode, in which selecting a combination of low power resource modes that maximizes potential power savings includes measuring a temperature of the computing device, and using the determined temperature sensitivity of current or power demand associated with each low power resource mode to determine potential power savings of a combination of low power resource modes at the measured computing device temperature. In the aspect methods, evaluating low power resources modes for each resource that may be placed in a low power mode may include accomplishing a table look up process using the a low power mode selection data table using potential power saving, estimated idle time and operating conditions, and the operating conditions may include a temperature value. The aspect methods may further include gathering statistics regarding operating conditions on the computing device, and updating the low power mode selection data table based upon the gathered operating conditions statistics. In the aspect methods, the operating conditions may be selected from the group including temperature, power consumption of particular low power resource modes, idle times experienced in various operating states, and typical device usage patterns. The aspect methods may further include determining whether the computing device is connected to external power, wherein updating the low power mode selection data table based upon the operating conditions statistics is accomplish when the computing device is connected to external power.

The various aspects also include a computing device that includes means for performing the functions of the aspect methods described above.

The various aspects also include an apparatus for conserving power in a computing device that includes a memory buffer and a processor coupled to the memory buffer, in which the processor is configured with processor-executable instructions to perform the operations of the aspect methods described above.

The various aspects also include a non-transitory storage medium having stored thereon processor-executable software instructions configured to cause a processor to perform operations for conserving power in a computing device that include the operations of the aspect methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
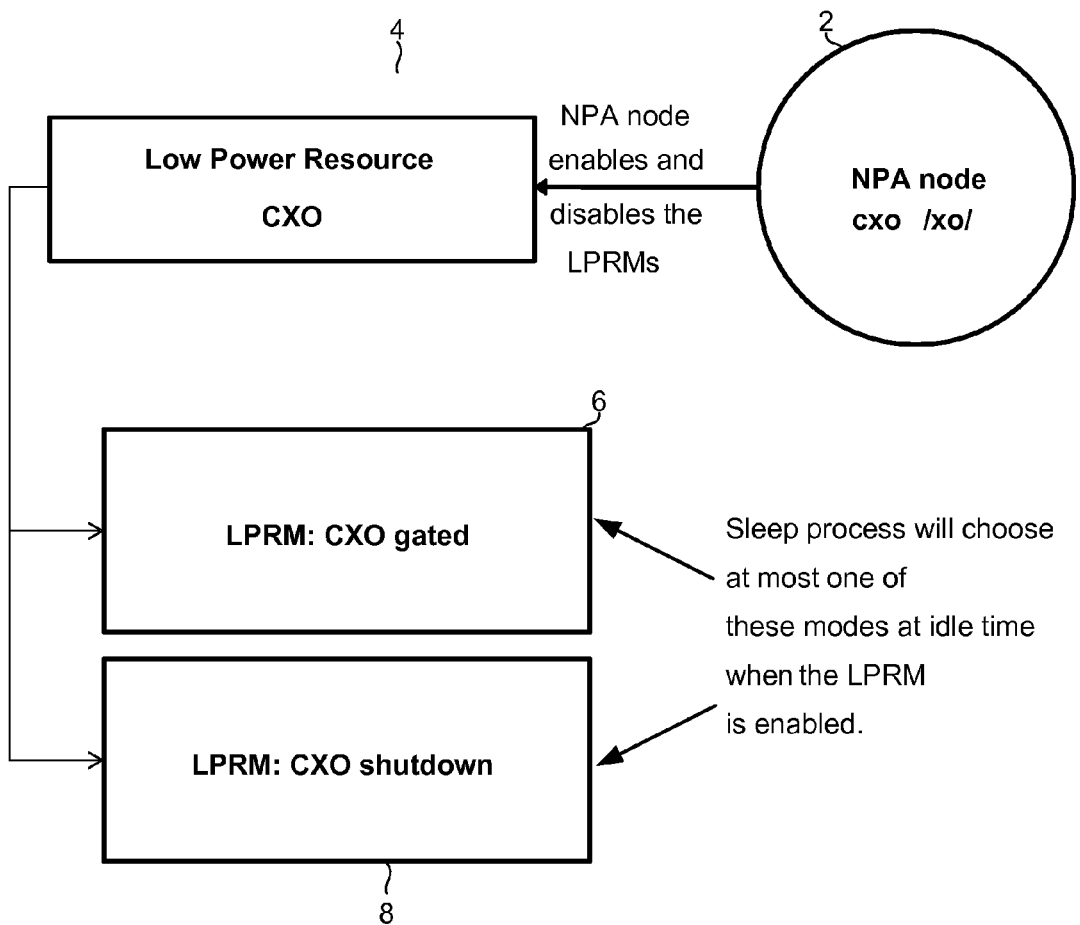
FIG. 1 is a diagram of a resource controlled by a programming node to enter one of two low power modes in an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "computing device" are used interchangeably herein to refer to any one or all of cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and operate under battery power such that power conservation methods are of benefit.

As used herein, the term "resource" is used herein to refer to any of a wide variety of circuits (e.g., ports, clocks, buses, oscillators, etc.), components (e.g., memory), signals (e.g., clock signals), and voltages (e.g., voltage rails) which are used to support processors and clients running on a computing device.

Maximizing the battery life of wireless devices is an important design criterion. Increased battery life maximizes the user's experience by allowing users to do more with a wireless device for longer periods of time. However, in order to truly maximize the user's experience, power saving strategies should be implemented so that they do not alter the device's functionality or reliability. As such, designing efficient and effective power saving schemes that do not alter functionality is an important goal for mobile and wireless device providers.

To maximize battery life, most mobile broadcast receivers are configured to place the one or more processors and device resources in a low power state whenever possible, such as when a processor is in an idle state. Placing device resources in a low power state typically consists of turning off the various device resources whenever the processor is not actively processing tasks, and/or is in an idle state. Resources that are able to be turned off, or placed in one or more low power and/or idle states, when the processor is not processing tasks and/or is in an idle state are referred to herein as low power resources, or LPRs. In multiprocessor devices, such as smart phones which may have a wireless modem processor and an application processor, the operations of implementing low power modes may be accomplished by each processor independently or in a coordinated manner.

A mobile computing device typically includes a number of resources that the device processor uses, such as a crystal oscillator, voltage rails, one or more memory units, communication busses, etc. With computing devices becoming ever more complex, the number of resources used or managed by device processors is increasing every year. For example, many mobile computing devices now include multiple crystal oscillators, multiple voltage rails, and multiple memories, each of which can be controlled independently. Consequently, there are many different resources that a computing device processor may turn off or place in a low power mode in order to conserve power. Also, computing devices may have multiple processors using the various device resources and performing different tasks (and thus may not be idle at the same time). For these reasons, a degree of executive control must be exercised when selecting resources to be placed in a low power mode. Choosing the resources to place in low power modes is known as the "sleep problem."

Generally, processors may turn off, disable, idle, or otherwise reduce the energy consumption needs of low power resources when the processor no longer needs a resource, such as when the processor enters a stable idle state. When the processor "wakes up" (e.g., leaves the idle state to perform another process), the resources must be turned back on, re-enabled and/or returned to an acceptable operating state. However, each low power resource may have different power consumption levels and latency characteristics (i.e., the time required to return the resource to a full power mode), and such characteristics may change with temperature and operating state. That is, each resource may consume a different amount of power in their various low power modes, may require a different amount of time to enter and leave the power off, idle and/or low power states, and may consume a different amount of power when entering and leaving such states. For the sake of clarity, the various low power modes available to each of the resources are referred to herein as low power resource modes or LPRMs.

If the power required to return a resource to its required operating state is greater than the power saved by having the resource in a low power mode for the estimated duration of the processor idle state, then the battery life of the wireless device may not be maximized by simply turning the resource off and/or placing it in a low power state whenever the processor is idle. Thus, the sleep problem of determining which low power resources should be turned off and/or placed in low power modes, as well as the particular low power modes that each resource should be placed in typically requires analysis of the processor state as well as states of other device processors, along with each resource's low power mode characteristics, such as latency, power saving potential, power consumption and interdependencies. Also, resource low power mode characteristics may be affected by operating conditions such as temperature, so such conditions should be evaluated as well.

As discussed above, each resource may have a set of low power modes or LPRMs into which the resource can be placed. Each low power resource mode of each resource may be characterized in terms of its latency, power savings potential, transition power consumption, low power mode entrance criteria, mode exit criteria and resource interdependencies, some or all of which may vary with temperature and other operating conditions. Resources may have more than one low power resource mode, each of which may have different power savings characteristics and latency times. For example, one low power resource mode for a resource may completely disable the resource (e.g., deenergizing the power), while a second low power resource mode may involve reduced functionality or periodic operation of the resource. Each low power resource mode may have different operating characteristics, such as providing different power savings per unit time and requiring different amounts of time to enter and leave the mode (i.e., different latency requirements). For example, a volatile memory chip may have two low power resource modes; a deep power-down mode which consumes the least amount of power but requires greater time to return to an operating state (i.e., greater latency), and a self-refresh mode which continues to consume some battery power but has lower latency (i.e., it can return to the full functioning state very quickly). Further, the power savings afforded by each low power resource mode may depend upon operating conditions, such as temperature and expected idle time. Thus, in some aspects, the low resource power modes may compute the expected power savings as the product of potential power savings per unit time at a current temperature, multiplied by the determined expected idle time. In other aspects, the expected power savings may be determined as another function of temperature, expected idle time and other variables.

As mentioned above, placing a resource in a low power mode and restoring it to a normal mode upon wakeup of the processor often requires some work, which takes both power and time (i.e., latency) to accomplish. The extra power and time necessary to enter a low power resource mode may not result in actual power savings if the amount of time that the system remains in an idle state is too short. In other words, the power consumed in placing the resource into a low power resource mode and returning it to full operation may be more than the power saved during the short time it was in the low power mode. Thus, the benefit of entering a particular low power resource mode may depend upon the expected time that the processor may remain idle. This time is referred to herein as the "expected idle time."

The amount of power that may be saved by placing a resource in a low power resource mode will vary based on the characteristics of the operating mode and of any required resources, as well as the amount of time that the resource will remain in that mode. For example, placing a memory chip in a self-refresh low power mode may consume power associated with the self-refresh processes as well as require the availability of power to the chip. Thus, the power savings available in a particular low power resource mode is an important characteristic to consider in selecting among a plurality of low power resource modes to decide upon a combination of low power resource modes to implement in a given sleep cycle.

As mentioned above, amount of power that may be saved by placing a resource in a particular low power resource mode may also depend upon environmental and operational factors, such as temperature. Temperature affects electrical resistance within the device. Thus, the power savings associated with the different low power resource modes of each resource at room temperature (as must be assumed when low power configurations are developed in advance) may be quite different in the field when the device is much colder (e.g., during the winter in Alaska) or warmer (e.g., during the summer in Texas). Consequently, the power savings of different low power configurations (i.e., selected set of low power resource modes) in real-life conditions may mean the real optimum low power mode is different from what can be anticipated in advance. Since the temperature of a device cannot be known in advance, this important characteristic cannot be used for selecting a combination of low power resource modes for the available low power resources using conventional methods for organizing and selecting low power modes.

While saving power is an important goal in configuring low power modes for electronic devices, consideration also should be given to ensuring the device continues to operate properly after entering a low power mode. Thus, consideration of the latencies associated with each low power resource mode is also important. As mentioned above, a certain amount of time is required to enter and exit a low power resource mode and return the resource to a normal operating mode. This latency time should be less than the expected idle time or the low power mode will be of little benefit. More significantly, the latency associated with exiting the low power resource mode, or a selected combination of low power resource modes, must be less than the maximum allowable system latency of any client or processor that may demand the resource or resources when it is in low power mode. If the latency associated with leaving a particular low power resource mode, or combination of low power resource modes, exceeds the system's acceptable latency, then the particular system low power configuration may not be acceptable because it could lead to a function error or cause some unrelated technology to function incorrectly.

An example of a situation in which latency requirements are an important consideration in the sleep problem is when a universal serial bus (USB) connector is plugged into a mobile device. The USB protocol typically has a very short latency requirement, and if the host does not receive a response to a resource request within that latency the host may conclude the device is malfunctioning. Thus, any low power resource mode of a resource, or any combination of low power resource modes, with an exit latency greater than the USB latency requirement should not be entered when a current operating configuration includes connection to a USB device.

In addition to latency and operating conditions, a resource's low power modes may also depend on other resources and/or conditions. Such resource interdependency considerations are referred to generally herein as "dependencies." These dependencies may be interdependent (i.e., the mode can only be enabled if another resource remains available), exclusive (i.e., the mode cannot be entered if a particular other resource is in a low power mode or not in a high power mode), or orthogonal (i.e., the modes have no relationship with one another and may be enabled independently). Low power mode dependencies may also be classified as being either "static" or "dynamic." Static dependencies are those that define conditions which must be met before a resource may even consider implementing a particular low power mode operation. Dynamic dependencies, on the other hand, arise when one mode can only be implemented in conjunction with another mode in the system, which is typically only determinable at runtime.

While static dependencies may be anticipated with some degree of certainty, dynamic dependencies are hard to determine ahead of time. Further, dynamic dependencies become exponentially more complex as the number of components and/or resources increase. Effectively managing the dynamic dependencies of low power modes will become more and more important as modern wireless devices continue to grow in complexity and include more components and resources.

Thus, configuring a device to conserve battery life by idling and/or disabling resources involves selecting from among the different low power resource modes of the resources in order to balance the various low power mode characteristics of power savings, latencies and interdependencies of the various resources, as well as the requirements of clients, processors, and applications that may be running concurrently. This selection process is a computationally difficult task (akin to the classic "knapsack" problem) due to the number of variables and permutations that may be considered, especially as the complexity of computing devices increase.

Currently, low power modes for processors and electronic devices are configured in advance by developers based on a static set of priorities and predictable characteristics. One or a few sets of low power configurations may be hard coded into a processor or system during development. The selection of one low power configuration from a set of low power modes is currently controlled by hardcoded if-then/else decision tree programming. When multiple predefined, system low power modes are provided, the processor may select among the various predefined modes by allowing the operating clients to indicate their various resource requirements or operating conditions by "voting." The result of client voting may be to explicitly disable one or more low power modes.

Known processes for selecting one system low power mode to implement from among a number of predefined system low power modes may consider temperature, expected idle time and latency requirements. However, such known method all require the system, processor or application developer to predefine a number of optional system modes by anticipating combinations of resources that may be placed in a low power mode, evaluate their likely interdependencies, total their latencies and anticipate system requirements and limitations at the time such mode might be entered. While the process of anticipating low power mode conditions and predefining a set of system modes from which a selection could be made was possible when processors and devices were relatively simple, it is anticipated that this design problem will become prohibitively difficult as system and processor complexity increases in the future.

Today's methods for developing and implementing system low power modes in computing devices cannot take into consideration a device's current, run-time, operating conditions (e.g., temperature), latency requirements or dependencies. Further, current implementations of low power configurations are not tuned to particular device configurations and cannot explicitly address the dynamic latency requirements of each of the low power resource modes of each particular client, since the operating state of such components cannot be predicted in advance. As such, the current method developing and implementing low power modes typically requires configuring a preset number of system low power configurations (e.g., idle mode, sleep mode, deep sleep mode, etc.) based upon presumptions that can be made in advance, and placing the system in a best one of the system low power modes based on selection criteria defined by the developer. Today's methods cannot dynamically generate a real-time low power configuration composed of a combination of low power resource modes that places each of the low power resources, as well as the processors, in a state that fully maximizes power savings.

In previous generations of devices, configuring low power modes in advance was reasonable because the number of different resources and clients that may interact with the processor was limited, such that a small number of different operating states could be anticipated. However, modern electronic devices are becoming ever more sophisticated, involving multiple processors, numerous resources and concurrent clients, such that it may no longer be possible to define optimum low power modes that can be hard coded into processors. Further, the selection of a previously defined system low power mode using if-then/else decision tree programming scales roughly according $2^n$ where "n" is the number of resources and clients involved in the determination. As result developers have to compromise on a subset of low power configurations that can be hardcoded in advance, which may be sub-optimal in some, if not all, operational states. Requiring developers to adopt sub-optimal low power configurations results in electronic devices that achieve less power savings than would otherwise be achievable if optimum low power modes could be defined and implemented for particular operating conditions.

In addition to the operational limitations of current programming of low power configurations, the effort of defining in advance a set of system low power modes and/or configurations (e.g., idle, sleep, deep sleep) and hard coding the modes into a processor or application involves significant developer effort. Further, hard coding the advanced set of low power modes does not address the various operation states that each of the resources could be in at any given time, and cannot respond dynamically to the overall power consumption levels and operation states of all the components in the system. Since the definition of the system low power modes is code-driven, and not data-driven, small changes made to device configurations and small changes made to the set of resource low power modes requires extensive retesting to confirm that the code changes do not cause device errors. Thus, current methods for implementing low power modes are unable to keep pace with changes in device configurations (e.g., components, software, etc.) that may occur during the production run of a product.

To address these and other concerns, the various aspects provide for dynamically generating a system low power configuration composed of a combination of low power resource modes selected from a multiple low power resources, to place each one of the individual low power resources, as well as the processors, in an operating state that fully maximizes the system-wide power savings. The various aspects provide methods that enable the sleep problem to be simplified for device processors so that more optimum low power configuration selections may be made by processors in real time, to offer a large number of low power configurations that can be fine tuned to the level of power savings currently achievable. The various aspects enable component developers to define various low power resource modes for each of their components that take various factors into consideration, such as the type of resources in use, the worst-case latency that can be tolerated, dynamic operating conditions (e.g., temperature), expected idle time, and component latency. The low power resource modes defined for each resource may also define static and dynamic dependencies. Device processors may then select any combination of low power resource modes dynamically, at runtime. In an aspect, device processors may compute and select a combination of low power modes that results in a system low power configuration or sleep state that maximizes power savings and/or operation speed while satisfying current operating requirements, including requirements of other processors and components in the system.

The various aspects also enable devices to select one or more low power resource modes by identifying resources that can be disabled as well as the resources that should remain on during a device low power configuration. The various aspects provide data and methods that can be used by a processor within a computing device to select a set of optimal or near optimum low power resource modes for resources when the processor goes into an idle state, while supporting functional reliability without requiring significant client interaction and extra processor action. The aspects enable a processor to determine a system low power configuration that provides the most system power savings while continuing to function reliably, depending upon the resources in use, the worst-case latency that can be tolerated, dynamic operating conditions (e.g., temperature), expected idle time, the required time to enter and exit the low power modes, and the unique electrical characteristics of the particular electronic device.

The various aspects provide a mechanism for determining an optimal system low power configuration made up of a set of low power resource modes for the various resources within the computing device by determining which of the resource's low power resource modes are valid at the time the processor enters an idle state, ranking the valid low power resource modes by expected power savings given the current device conditions, determining which of the valid low power resource modes provides the greatest power savings while meeting the latency requirements, and selecting a particular low power resource mode for each resource to enter. By doing so, the various aspects eliminate the concept of fixed predefined system low power configurations, thereby simplifying the developer's problem by enabling developers to address each resource separately and shifting the sleep problem to run time by enabling the processor to select the set of low power resource modes to be implemented when the processor enters an idle state. This enables the implementation of low power modes to be driven by operational data, and gives processors the ability to self optimize system low power modes by learning about how the device is used and operates. In addition to providing greater power savings in a typical implementation compared to current methods, the various aspects also simplify the development of electronic devices.

For the sake of clarity and to remove any ambiguity between "low power modes" and "low power resources," it should be understood that each low power resource can have multiple low power modes. Multiple low power resources can be activated, enabled, deactivated and/or disabled in a given idle state. Thus, an overall "system low power configuration" is defined by a selection of a low power modes for each of the resources available for entering a low power mode based upon the current operating state and conditions. It should also be noted that due to latency restrictions and resource dependencies (as described below), the optimum system low power configuration may not involve placing every one of the plurality of resources available for idling into a low power mode. Thus, the selection of an optimum system low power configuration may identify some resources that must remain in an operating state for latency, statistical availability and other reasons.

The various aspects also enable defining low power resource modes for those resources that are used by the processors, and thus cannot be simply disabled when no longer in use. Resources used by a processor need to be enabled and disabled in a controlled fashion in order for the system to function properly. Given this requirement, disabling such resources after they are no longer in use must be deferred until the processor gets into an idle state where the resource can be disabled. The process of entering a system low power configuration or mode is referred to as entering a low power state.

The various aspects enable resources to indicate when they are available to enter a low power state by enable a flag bit within a low power mode mask ("LPM mask") that can be used by the processor to select an appropriate combination of LPRMs to implement in a system low power configuration when the processor enters an idle state. When a resource is in use, the resource may disable the flag bit in the LPM mask. In various aspects, enabling and disabling the bits within the LPM mask may be accomplished by a driver function within processor-dependent resource programming nodes that may call an application programming interface (API), such as described further below. Thus, at the instant that a processor is able to enter an idle state, the LPM mask can be accessed to determine which resources are able to be placed in a low power mode.

As discussed above, when a resource is no longer in use and the processor is entering an idle state, the resource may be placed in a low power mode, such as one of the resource's low power resource modes. However, just because a resource is no longer in use and the processor is entering an idle state is not always a sufficient basis for placing the resource in a low power mode. Further, for resources that support different types of low power resource modes, the processor must make a selection among the alternative low power resource modes based on current operating conditions (e.g., temperature), addressing the total power savings that may be achieved within the expected idle time, the latency requirements of current clients and other processors, and various other factors. In various aspects, the power savings for a particular low power resource mode for a particular resource may depend on temperature and time, such that the potential power savings of each evaluated low power resource mode may be determined by multiplying a potential power savings per unit time at a current temperature (which is a factor that may be included in the low power mode definition) times the determined expected idle time. Further, the low power mode selection should also take into account other variables including the particular electronic device characteristics, the device software implementation, the expected time in the idle condition, and the device state, such as clock speed, etc.

When the processor is ready to enter a system low power configuration, such as when the processor is ready to enter an idle state, a low power task may access the LPM mask to identify the resources which can be placed in a low power state and determine the appropriate low power resource modes to enter for those resources based upon a given dynamic system state (e.g., currently active clients, required latency, expected idle time, and temperature). To enable the processor to accomplish this determination, each resource may define low power resource mode characteristic data that specifies information required for selecting an optimum set of low power resource modes to be implemented for a given state. This specified information may include a listing of each low power resource mode available for the resource, potential power savings for each low power resource mode as a function of time or per unit time, latency characteristics for each low power resource mode (i.e., time to exit the low power mode), temperature effects on potential power savings, dependencies (i.e., interdependencies with other resources that clients), and other information that may be relevant to selecting an optimum low power resource mode for each resource. Such information may be specified for a resource in a variety of ways and data structures, a C code example of which is listed below.

```
typedef struct
{
    /* The name of this low power resource, for example "apps core voltage." */
    const char    *resource_name;
    /* The number of low power modes this resource can enter. */
    uint32_t      mode_count;
    /* The list of low power modes this resource can enter. */
    LPM_Resource_Mode *modes;
} LPM_Resource;
```

In this definition, the bulk of the resource data is included within the resource low power mode definitions. Definitions of the low power modes for resources may be written in C code as follow:

```
typedef uint32_t (*LPRM_PowerSavingsFcn)
        (uint32_t duration_us, int32_t temp_c);
typedef struct
{
    uint32_t enter;
    uint32_t exit;
}
sleep_latency_type;
typedef uint32_t (*sleep_power_func)(uint32_t duration_us, int32_t temp_c);
typedef struct LPRM
{
    /* The name of this low power mode (e.g. "minimization"). */
    const char              *mode_name;
```

-continued

```
    /* Functions that describe the mode's characteristics. */
    LPRM_PowerSavingsFcn power_savings;
    LPRM_LatencyFcn   latency;
    /* Functions that implement the actual setup and teardown of a mode. */
    LPRM_EnterFcn    enter;
    LPRM_ExitFcn    exit;
    /* The LRR's that much be enabled for this mode to happen. */
    uint32_t                lpr_dependency_count;
    const char              *lpr_dependencies;
    /* The LPR's that cannot be entered if this mode is selected. */
    uint32_t                lpr_exclusion_count;
    const char              *lpr_exclusions;
    /* Some reserved bookkeeping fields after this point-initialize to 0. */
}
LPM_Resource_Mode.
```

The foregoing C code is written for the general case. Example C code for defining the low power modes for the specific case of a voltage rail resource is presented below. An example of C-code definitions for crystal oscillator (CXO) resource low power modes is listed below. In this example, the processor supports two options for operating the crystal oscillator resource in low power mode: a gated mode which saves clock tree power but still consumes power running the oscillator; and a shutdown mode which saves clock tree power and oscillator power, but requires significant warm-up time after exiting this low power mode (i.e., it has a relatively long latency).

```
const char *cxo_gated_deps[ ] = {"lpr://cxo"};
LPM_Resource_Mode cxo_gated =
{
    .mode_name = "gated"; /* what is gated is in LPR */
    .power_savings = cxo_gated_power; /* based on data */
    .latency = cxo_gated_latency; /* based on data */
    .enter = cxo_gated_enter; /* calls mpm driver */
    .exit = cxo_gated_exit; /* calls mpm driver cleanup */
    LPRM_DEPENDENCY_ARRAY(cxo_gated_deps);
    LPRM_EMPTY_ARRAY( ); /* no exclusions in this mode */
}
const char *cxo_stdn_deps[ ] = {"lpr://cxo"};
LPM_Resource_Mode cxo_shutdown =
{
    .mode_name = "shutdown";
    .power_savings = cxo_stdn_power; /* based on data */
    .latency = cxo_stdn_latency; /* based on data */
    .enter = cxo_stdn_enter; /* different mpm call */
    .exit = cxo_stdn_exit; /* mpm cleanup call */
    LPRM_DEPENDENCY_ARRAY(cxo_stdn_deps); /* same as gated*/
    LPRM_EMPTY_ARRAY( ); /* no exclusions in this mode */
}
LPM_Resource_Mode *cxo_modes[ ] = {&cxo_gated, &cxo_shutdown};
LPM_Resource cxo =
{
    .resource_name = "CXO";
    LPM_MODE_ARRAY(cxo_modes);
};
// At startup:
sleep_define_lpr(&cxo);
// CXO modes are now registered with /sleep/lpr and start disabled.
// Next, how a controlling NPA node can enable them.
// Startup:
client = npa_create_sync_client("/sleep/lpr", "/xo/cxo",
NPA_CLIENT_REQUIRED);
npa_query_type q;
q.reference = "lpr://cxo";
npa_query_by_client(client, SLEEP_QUERY_LPRM_BITMASK, &q);
uint32 bitmask = q.value;
// To enable:
npa_issue_required_request(client, bitmask)
// To disable:
npa_complete_request(client)
```

It should be noted that the portion of the example code related to controlling a node power architecture (NPA) node and other references to an NPA node or NPA methods herein are for illustration purposes only. The various aspects are not limited to accomplishing the enabling and disabling of resources through an NPA node or using a node power architecture. Therefore the scope of the claims should not be construed to requiring an NPA node or NPA process unless specifically so recited in the claims.

Another example of C code appropriate for defining the low power modes for voltage sources (Vdd) is presented below. In this example, the processor has two system-level voltage rails supplying Vdd that are controlled for the digital logic and memory circuits, referred to in the code as "dig" and "mem." Placing the voltage rails in low power mode requires a latency penalty associated with bringing the resource back online upon exiting the low power mode. The control of these two voltage rails is coupled because if one voltage rail is placed in a low power mode, the other voltage rail can also be placed in low power mode without incurring an additional latency penalty since the two resources can be "warmed up" in parallel. To handle this interdependency, the following code defines three low power modes for a single resource "system Vdds," namely: dig and mem minimization; mem-only minimization; and dig-only minimization.

```
const char *dig_mem_deps[ ] ={"lpr://vdd_dig", "lpr://vdd_mem"};
LPM_Resource_Mode dig_mem =
{
   .mode_name = "Dig/Mem Min";
   .power_savings = dig_mem_power;
   .latency = dig_mem_latency; /* this is roughly equiv to dig_latency or mem_latency-they might share this */
   .enter = dig_mem_enter; /* calls mpm driver */
   .exit = dig_mem_exit; /* calls mpm driver cleanup */
   LPRM_DEPENDENCY_ARRAY(dig_mem_deps);
LPRM_EMPTY_ARRAY( ); /* no exclusions in this mode */
const char *mem_deps[ ] = {"lpr://vdd_mem"}; LPM_Resource_Mode mem_min
=
{
   .mode_name = "Mem Min";
   .power_savings = mem_power;
   .latency = mem_latency;
   .enter = mem_enter; /* calls mpm driver */
   .exit = mem_exit; /* calls mpm driver cleanup */
   LPRM_DEPENDENCY_ARRAY(mem_deps);
LPRM_EMPTY_ARRAY( ); /* no exclusions in this mode */
}
const char *dig_deps[ ] = {"lpr://vdd_dig"}; LPM_Resource_Mode dig_min =
{
   .mode_name = "Dig Min";
   .power_savings = dig_power;
   .latency = dig_latency;
   .enter = dig_enter; /* calls mpm driver */
   .exit = dig_exit; /* calls mpm driver cleanup */
   LPRM_DEPENDENCY_ARRAY(dig_deps);
LPRM_EMPTY_ARRAY( ); /* no exclusions in this mode */
}
LPM_Resource_Mode *sys_vdds_modes[ ] = {mem_dig, mem_min, dig_min};
LPM_Resource sys_vdds =
{
   .resource_name = "System Vdds";
   LPM_MODE_ARRAY(sys_vdds_modes);
};
// At startup:
sleep_define_lpr(&sys_vdds);
// The modes are now registered with /sleep/lpr and start disabled.
// Next, how a controlling NPA node can enable them.
// Startup:
dig_client = npa_create_sync_client("/sleep/lpr", "/rail/vdd_dig", NPA_CLIENT_REQUIRED);
mem_client = npa_create_sync_client("/sleep/lpr", "/rail/vdd_mem", NPA_CLIENT_REQUIRED);
npa_query_type q;
```

-continued

```
q.reference = "lpr://vdd_dig";
npa_query_by_client(dig_client, SLEEP_QUERY_LPRM_BITMASK, &q);
uint32 dig_bitmask = q.value;
q.reference = "lpr://vdd_mem";
npa_query_by_client(mem_client, SLEEP_QUERY_LPRM_BITMASK, &q);
uint32 mem_bitmask = q.value;
npa_issue_required_request(mem_client, mem_bitmask);
// Only "Mem Min" mode enabled right now
npa_issue_required_request(dig_client, dig_bitmask);
// All three modes enabled right now
npa_complete_request(mem_client)
// Only "Dig Min" mode enabled right now
npa_complete_request(dig_client)
// Back to no modes enabled
```

The dynamic low power resource registration mechanism described and illustrated above allows the set of low power resources and modes to be dynamically extended. This capability includes providing for "virtual low power modes," which are low power operating states that are not for resources, but if handled in a similar manner, can allow for reduced power operations. An example of such virtual low power modes includes suspending display refresh processes when the processor goes into an idle state since no new content will be generated that would require a refresh. Other operations and device components thus may be managed using the various aspects to enable reduced power consumption even though the components are not resources per se.

In the various aspects, when a processor is able to enter an idle state, a low power task may run a "solver" process to determine which low power modes for the various resources should be entered as part of a system low power configuration for a given sleep cycle. In such cases, the low power modes and the characteristics of those low power modes for the different resources may need to be collected for use by a sleep task to be evaluated when it is time to enter the idle state. In an aspect, this may be implemented in a node power architecture (NPA) through a "/sleep/lpr" NPA node. Requests to "/sleep/lpr" may be made in the form of bitmasks that enable low power resource modes. In various aspects, developers may register a low power resource mode via a sleep_define_lpr( ) function that enrolls the low power resource mode (and its resource low power mode bitmasks) with the "/sleep/lpr" NPA node. In various aspects, the "/sleep/lpr" NPA node may be queried at any time for the bitmask that represents the resource low power resource modes they are interested in enabling/disabling. NPA resources can also request that their resource low power resource modes be enabled at idle time by making a request into "/sleep/lpr" with the right bitmask. The sleep solver can then query "/sleep/lpr" at idle time for the list of low power resource modes and the mask of which ones are currently enabled.

As discussed above, in the various aspects, when a processor is able to enter an idle state, a low power task may run a "solver" process to determine which low power resource modes for the various resources should be entered. An example of this is illustrated in FIG. 1 which illustrates how a process (i.e., node) within a node power architecture (NPA) 2 determines for a resource, such as a crystal oscillator 4, which of two available low power modes 6, 8 can be entered. In the example illustrated in FIG. 1, the crystal oscillator resource 4 has two alternative low power modes, namely a gated operating state 6 and complete shutdown 8. Selecting an optimum set of low power modes for each of the various resources eligible for being placed into a low power mode involves selecting one of the available modes for each of the eligible resources. In an aspect, each of the selected low power resource modes may be entered by calling an "enter" function of the low power resource mode. Once the enter function of the low power resource mode is called, the resource may be placed in a power savings state defined by its selected low power resource mode. While the processor is idle, the processor may perform a wait for interrupt (WFI) process and/or idle process. The processor and selected resources may remain in this state until a wakeup event occurs. When a wake-up event occurs, for each selected resource, an associated "exit" function may be called to return the resource to the desired operating state (e.g., a normal or full power state).

Figure 2:
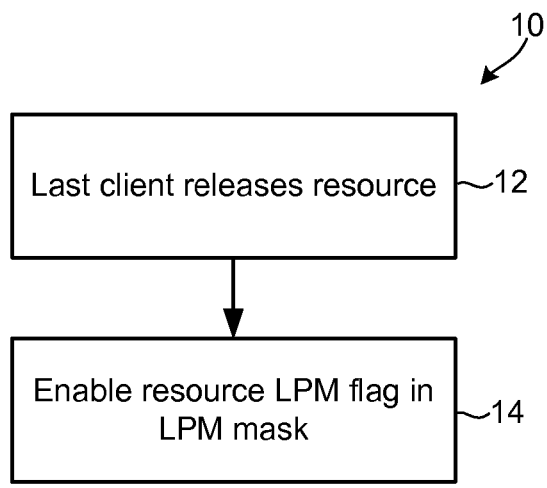
FIG. 2 is a process flow diagram of a method by which a shared resource registers its ability to enter a low power mode according to an aspect.
Figure 3:
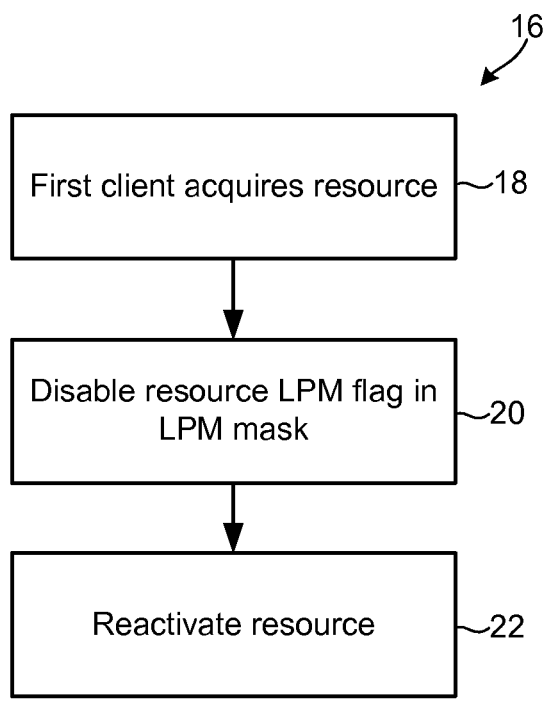
FIG. 3 is a process flow diagram of a method by which a shared resource registers exits a low power mode according to an aspect.
Figure 4:
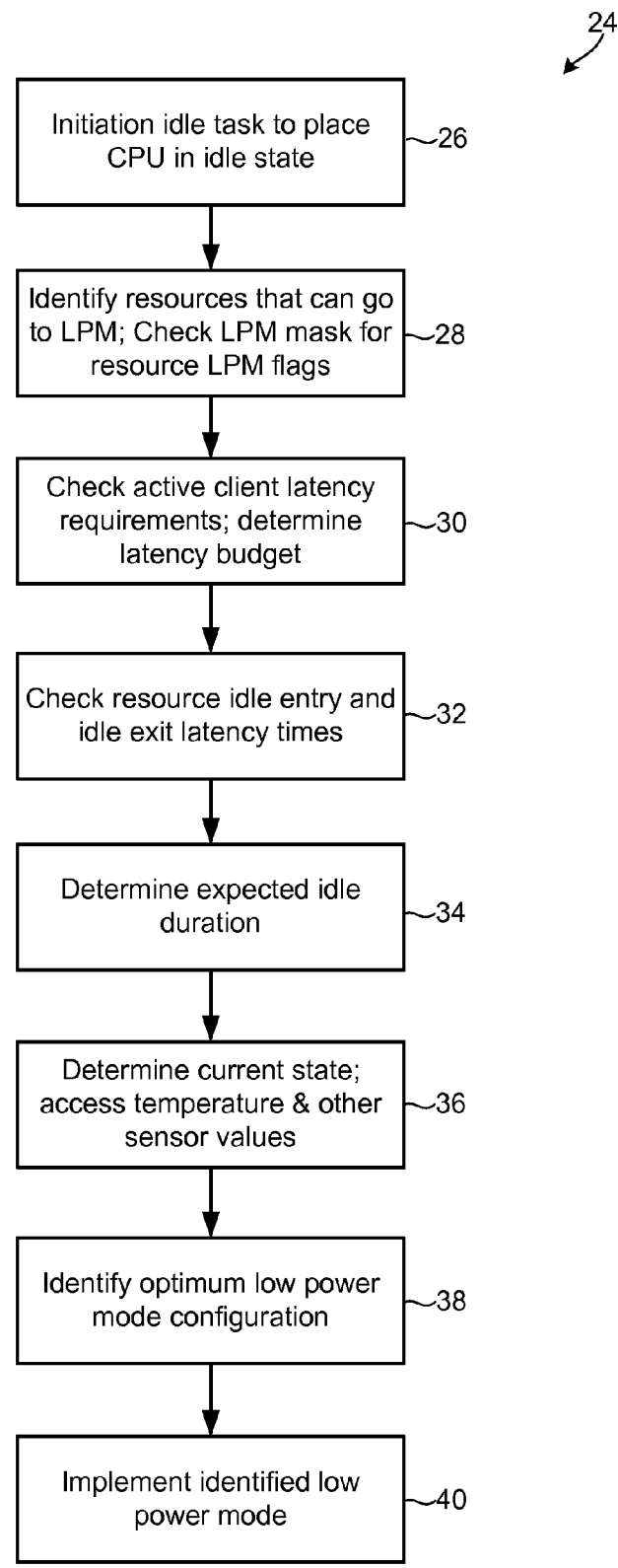
FIG. 4 is a process flow diagram of a method for selecting and entering a low power mode according to an aspect.

Processes for implementing the various aspects are illustrated in FIGS. 2-4. Referring to FIG. 2, in aspect method 10, when a resource is no longer in use because a client has released the resource at block 12, the low power resource mode flag may be enabled in the LPM mask at block 14, such as by implementing an operation as illustrated in the examples listed above. At this point, the resource has indicated that it is available to be placed at a low power resource mode. When a wake-up event occurs and a client requests access to a resource, method 16 illustrated in FIG. 3 may be implemented. When a client requests a resource at block 18, the low power resource mode flag for the resource may be disabled in the LPM mask at block 20, such as by implementing an operation as illustrated in the examples listed above. At block 22, the resource may then be reactivated such as by accomplishing an associated "exit" function as mentioned above.

FIG. 4 illustrates an aspect method 24 by which a processor may identify an optimum system low power configuration (i.e., an optimum set of low power resource modes) to implement in a particular idle and/or low power state. When an idle and/or sleep task is initiated to place a processor in a low power state at block 26, the processor may identify those resources that can be placed in a low power resource mode by checking the low power resource mask for resource low power resource mode flags. At block 28 the processor may check the LPM masks for low power resource mode flags to identify the resources that can be placed in a low power resource mode. At block 30, the processor may check the latency requirements of active clients, tasks, or subsystems running on the system. For example, the processor may access a data structure defined for a client, and use that information to determine a latency budget. The latency budget may define the total latency that the system can accommodate during a wake-up from a system low power state.

In an aspect, the latency budget may be defined as the minimum of all the latencies acceptable to all the concurrent processors and clients, or the worst case latency, or the most stringent latency. For example, a USB resource connected to a host may be required respond within 1 millisecond whenever the host initiates a communication with the USB. In this example, the latency requirement of the host is 1 millisecond. Thus, when the system is idle, the processor may not turn off resources, or any combination of resources, that require more than a millisecond to turn back on. This is because, at any given time, the host may issue an interrupt to turn the system back on requiring the resources to return to an operating state capable of handling the requested task. That is, the system is limited to implementing low power resource modes that will not require, in aggregate, more than 1 millisecond to exit when the host issues an interrupt. If, at some future time, the USB is disconnected from the host, the 1 millisecond response time is no longer required because USB is no longer a task that is being performed. In this circumstance, the worst case latency could change to some other value (e.g., 5 milliseconds) because there may be some other task that has been executing the whole time with a higher latency requirement. Thus, in the various aspects, the latency requirements may be a dynamic property depending on the system state that can be evaluated at the time so that a system low power mode configuration can be determined based on the current operating state requirements. Additionally, the low power resource modes may themselves have their own latency requirements, as well as interdependent latencies. Thus, in certain situations, not all the low power resource modes available to be entered, can be entered. This is because entering certain low power resource modes may result in an overall system latency that violates the worse case latency requirements of the current operating state.

Returning to FIG. 4, at block 32, the processor may check the resource definition data for the mode's idle entry and idle exit latency times for the various low power resource modes. At block 34, the processor may determine the expected idle time (i.e., the duration that the processor is expected to remain in the idle state before a wake-up event given the current conditions and operating state). At block 36, the processor may determine current state conditions, such as by accessing a data register storing the current temperature and other sensor values. Using the current state and low power resource mode data gathered in blocks 28-36, the processor may execute a "solver" function to identify an optimum low power configuration in block 38. The solver function may use a number of different approaches for balancing the various considerations necessary to identify acceptable optimum low power configuration, some examples of which are described below with reference to FIG. 7-10. As part of one or more of blocks 28-38, the processor may calculate potential power savings that may be expected for each low power resource mode and each combination of low power resource modes, such as by calculating the potential power savings per unit time at a current temperature (and other operating condition) times the expected idle time, and use this value as part of the solver process in block 38. Once an optimum low power configuration is identified, one or more low power resource modes are selected for each resource, task and/or subsystem, the processor may enter that low power configuration in block 40, such as by causing each selected low power resource modes to execute an associated enter function. The system will remain in this idle state and/or low power state until a wakeup event occurs, such as a timer interrupt. When a wake up event or interrupt occurs, the processor and associated resources will exit the idle state, such as by executing a series of exit functions for each of the resources in low power resource modes that return those resources to their normal operating state.

In the various aspects, there may be a known wake up event that is associated with the timer sub-system that gets quarried directly. The various aspects may also include a wake resource that allows clients to "hint" that they believe a wake up event will occur in a certain amount of time. In various aspects, the system may include mechanisms that predict and/or control how long the resources and/or processors are likely to remain in a given sleep state. In these aspects, the processor may postpone certain events to control how long the resources can expect to be asleep. In various aspects, there may be a hard wake up point at which the resources are forced to wake up. In various aspects, the system may use the "hints" from the resources to determine an expected wake up time frame. The various aspects may implement predictive algorithms that may be used by the processor to estimate the most efficient wake up time. The various aspects may use a combination of a hard limit, hints, and learning mechanisms to determine an expected wake up time. The various aspects may use the expected wake up time to determine how much power would be saved if the various resources are placed in low power resource modes until the determined expected wake up time. Such expected power savings may then be used in the process of selecting particular resources to place in a low power mode (i.e., selecting low power resource modes) to implement in a system low power mode configuration for an impending sleep cycle.

The various aspects may use both the sum of the power savings and the energy cost of bringing the resources down and back up to operation to determine a power function. The various aspects may use the power function to determine which resources, if any, should be placed in a low power resource mode. The various aspects may also use the power function to determine the net power savings associated with each of the potential system low power configurations afforded by various combinations of implemented low power resource modes. The various aspects may calculate the net power savings as the amount of power saved over a calculated time frame, offset by the amount of work required to place the various resources into a low power resource mode and return them to an operation mode. In various aspects, the net power savings may be calculated by a function using a simple linear polynomial module, having an expected idle time X with a slope M and an offset B, wherein the compute power savings is MX+B. The various aspects may calculate the net power savings periodically based on values stored in configurable system parameters.

In various aspects, the net power savings may be tabulated for each resource. That is, the various aspects may pre-compute a table containing the various net power savings associated with each of the available low power resource modes. The various aspects may also generate a tabulated list on the fly, continuously, or periodically, in accordance with values stored in configurable system parameters. In various aspects, the boundaries between the decisions may be stored in a table and referenced when making a determination as to which potential system low power configuration is best suited to the current system needs and operating state. For example, the system may store information that indicates a number of preferred low power configurations based on time (e.g., preference for mode A until X time, then preference for mode B until Y time, then preference for modes A and B).

In the various aspects, LPM flags are not restricted to governing a resource explicitly, because the process of checking for dependencies may be pushed down to the level at which low power resource modes are selected to define an optimum system low power mode configuration. For example, assume resource 'A' has two low power resource modes '1' and '2'. Since both modes '1' and '2' are of the same resource, they may share a common LPM mask bit which indicates that the resource can be put into a low power resource mode. Thus, in this example modes '1' and '2' both depend on bit 'A' within the LPM mask, and bit 'A' is controlled by the NPA resource driver for the resource. However there may be a further complication in that mode '2' could be a specialized form of mode '1' that has a dependency on both resource 'A' being able to go to sleep (i.e., not used by any client or processor) and resource 'B' being able to go to sleep as well. In other words, low power resource mode '2' of resource 'A' may depend on resource 'B' also being placed in a low power mode. Therefore, in this example, mode '2' will depend on the LPM mask bits of both resources 'A' and 'B'. Thus, in this example, the LPM flags do not explicitly govern the resource due to the dependency of mode '2'.

To illustrate static and dynamic dependencies, consider the example of a voltage regulator resource providing power to a clock driver resource and some other miscellaneous hardware resource. The voltage regulator may have two operating modes: normal and low power (i.e., its low power resource mode). Putting the voltage regulator into a low power state may reduce the amount of energy overhead consumed by the voltage regulator, resulting in an overall lower system power demand. However, if more power is drawn from the voltage regulator than is allowed in its low power mode, the voltage regulator might fail and potentially damage the device hardware. For example, the clock driver may consume more power than the voltage regulator can provide in its low power mode. In this case, the voltage regulator may have one static dependency with respect to the clock driver (i.e., the clock must be able to be turned off), and another static dependency with respect to the other miscellaneous hardware (i.e., the miscellaneous hardware must be turned off). In addition, the voltage regulator may have a dynamic dependency: as long as the clock driver remains on, there will be too much power drawn from the voltage regulator for it to enter a low power mode. As soon as the clock driver turns off, then there will be no load on the voltage regulator and it will be able to enter a low power mode. Thus, the clock driver's power off mode is a dynamic dependency of the voltage regulator's low power resource modes.

As discussed above, while static dependencies may be anticipated with some degree of certainty, dynamic dependencies are hard to determine a head of time. Further, dynamic dependencies become exponentially more complex as the number of components and/or resources increase. In various aspects, a solver process is used to manage the various dynamic dependencies. In various aspects, an idle task is used to manage the various dynamic dependencies.

Figure 5:
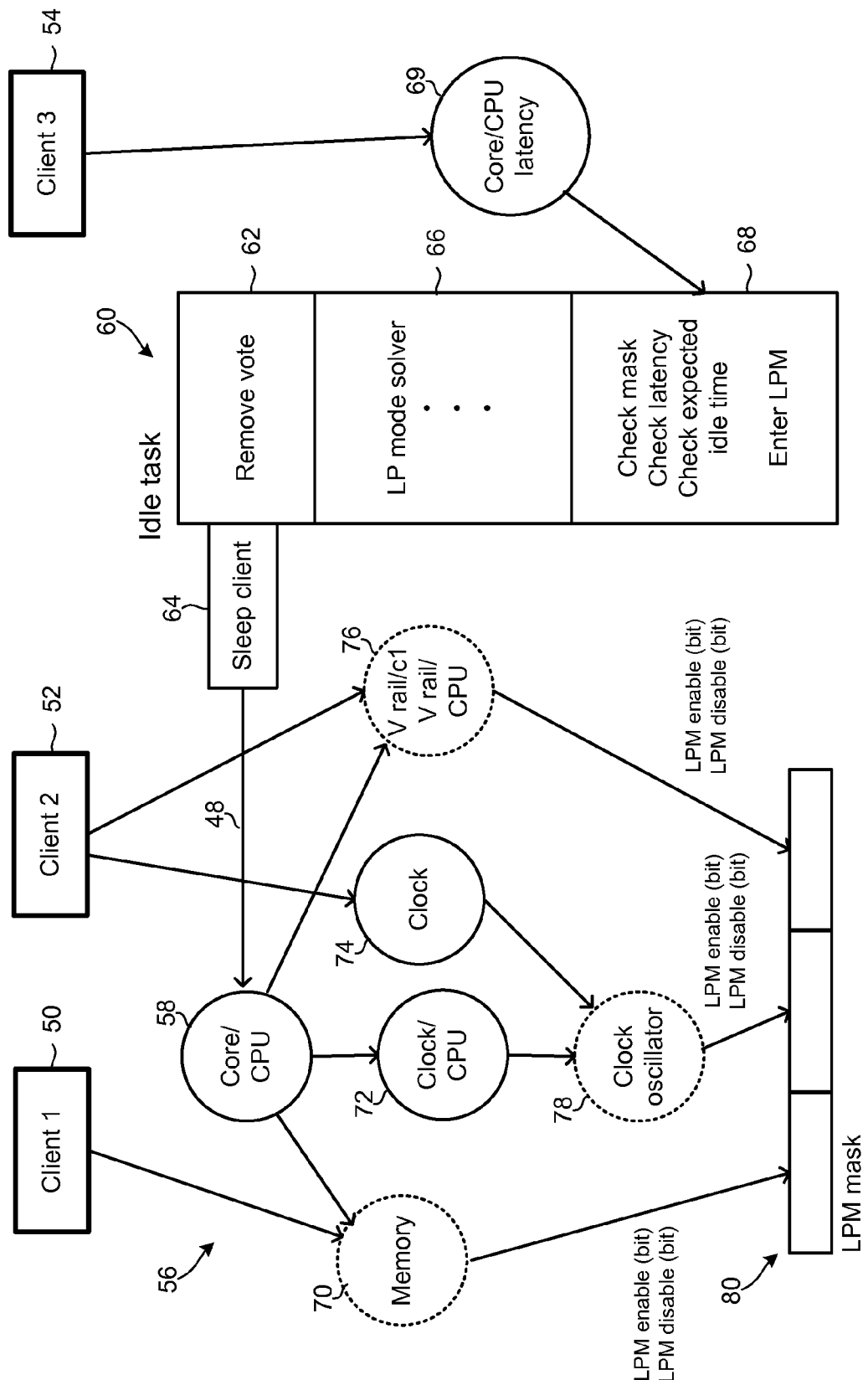
FIG. 5 is a programming node and resource diagram illustrating an aspect method for selecting and entering a low power mode.

Operations of various aspects are illustrated in FIG. 5, which shows a programming node and resource graph illustration. FIG. 5 illustrates an operating state in which three clients 50, 52, 54 are active and three resources are available for being placed into a low power resource mode, specifically memory 70, a clock oscillator 78 and a voltage rail 76. In this illustration, processing nodes 58, 69, 72, and 76 represent processes which are traversed when the system is ready to enter a low power resource mode by executing an idle task 60. Instead of polling the clients 50, 52, 54 for votes, that process is removed 62 and replaced with a sleep client 64 which traverses the node diagram in order to put the system into a low power state based on a low power configuration. In this illustration, client 1 50 (which was using the memory) releases the memory, as indicated by the arrow 56 to node 70, and sets the appropriate low power resource mode enablement bit in the LPM mask. Similarly, client 2 52 may release the voltage rail resource and the clock as indicated by the arrows to nodes 74 and 76, which set the appropriate low power resource mode enablement bits in the LPM mask. When client 3 54 releases the processor as indicated by the arrow to node 69, the processor may execute the idle task 60 by checking the LPM mask, checking the system latency, and checking the expected idle time 68 before executing a low power mode solver 66 process. After the entire graph has been traversed, the sleep client 64 may invoke the low power resource mode "enter" functions with the set of active low power resource modes selected for the resources based on the given current dynamic conditions.

Figure 6:
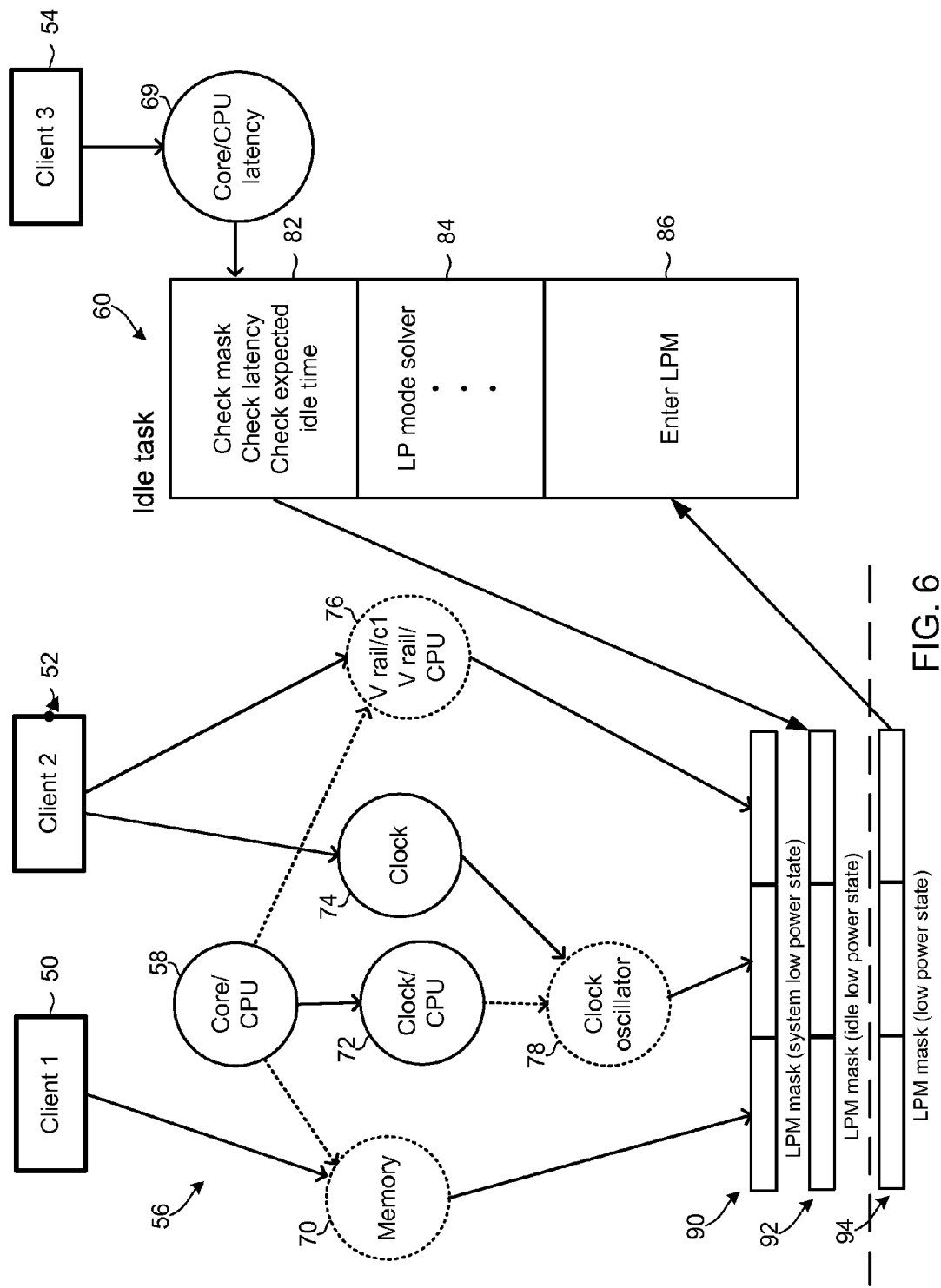
FIG. 6 is a programming node and resource diagram illustrating another aspect method for selecting and entering a low power mode.

FIG. 6 illustrates a similar process node and resource graph for another aspect method. This aspect method provides the additional benefit of removing the processor graph traversal from the sleep timeline. As illustrated in FIG. 6, the processor dependencies (illustrated by arrow 48 in FIG. 5) can be omitted from the process node graph by allowing the processor resources to use a special API to directly interact with the low power resource mode masks. FIG. 6 also illustrates that the LPM mask 80 (illustrated in FIG. 5) can be replaced by an LPM mask for a system low power state 90, an LPM mask for an idle low power state 92, and an LPM mask for a low power state 94. In this aspect, the resources available for being placed into a low power resource mode (e.g., memory 70, clock oscillator 78, and voltage rail 76) may directly set the LPM enable (bit) and/or the LPM disable (bit) in the LPM mask for a system low power state 90. When a client 3 54 releases the processor as indicated by the arrow to node 69, the processor may execute the idle task 60 by checking the LPM mask for the idle low power state 92, checking the system latency, and checking the expected idle time 82. The low power resource mode "enter" functions 86 of the idle task 60 may be invoked with the set of active low power resource modes selected 84 for the given current dynamic conditions via the LPM mask for a low power state 94.

In an example aspect, low power resource modes may be implemented as a series of bit vectors. For example, there may be bit vectors for: the system low power state (i.e., the currently active low power states due to resource usage and clients outside of the client path context); idle low power state (i.e. the currently active low power mode states due to dynamic system conditions discovered in the idle task, such as latency and expected idle time); debug/bring up conditions (e.g., via nonvolatile items or similar); and one bit for each core processor node dependency. The default state for each bit may be low power resource mode disabled. Clients setting resource usage requirements by transiting the node graph illustrated in FIG. 5 or 6 may cause any of the low power bits to be enabled, thereby allowing a particular resource to be placed in a low power resource mode. In an aspect, the idle task may gather data on other factors, including inter-mode dependencies, latency, expected idle time, and temperature, and set its own bit mask. In this aspect, which is not shown in the figures, the final LPM mask settings may be determined via a bitwise add of the system and idle masks.

In the various aspects, a number of mechanisms may be used in the low power resource mode selections solver to identify an optimum set of resource low power resource modes based upon the current operating state and conditions. In general terms, the problem of selecting the optimum set of low power resource modes is a form of the "knapsack problem" which is a well known problem in combinatorial optimization. A variety of known algorithm or heuristic solutions to the knapsack problem may be implemented in the low power resource mode selections solver. Such methods may involve if/then/else logic tree algorithms, a table lookup algorithm, and comparison methods which work systematically through the alternative permutations and combinations of alternative low power resource modes of different resources.

Figure 7:
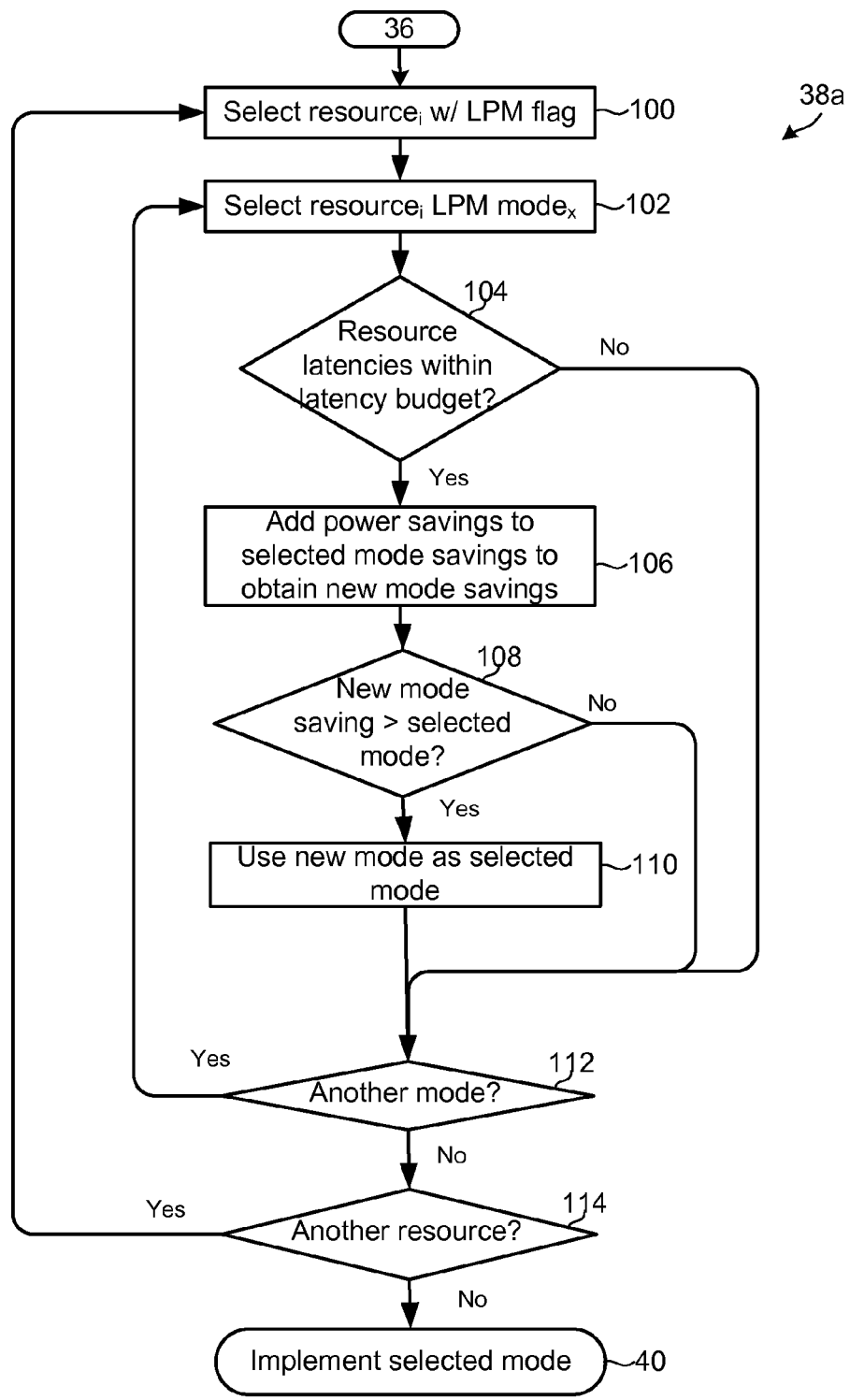
FIG. 7 is a process flow diagram of an aspect method for selecting an optimum low power mode.

By way of example, FIG. 7 illustrates an aspect method 38a for selecting an optimum set of low power resource modes by working through the various resources and alternative low power resource modes. Method 38a may be accomplished as part of method 24, described above with reference to FIG. 4, and thus the low power resource mode characteristics and bitmaps may be assumed to have already been accessed, including the potential power savings, the exit latency time and dependencies. To evaluate all of the low power resource modes of all of the resources that may be placed in a low power resource mode, at the time of the current idle state, the processor may incrementally select each resource for which an LPM flag is enabled in block 100 and then incrementally select each low power resource mode for the selected resource in block 102. The manner in which flags set in the LPM mask are checked may vary depending upon the implementation and upon the interdependencies of the various resources. In an implementation, the processor may check the flags in the LPM mask and not consider any of the low power resource modes for that resource if that bit is not set. For example, if the processor knows that all of resource 'A' low power resource modes require the 'A' bit to be set, the processor can check for the 'A' bit in box 100 and not consider any of the low power resource modes for that resource if that bit is not set. However, the processor may still need to check the LPM mask in block 102 because some low power resource modes for the selected resource may require that additional resource bits also be set (or not set) in accordance with its dependencies. Thus, in an aspect, before selecting a particular low power resource mode for a selected resource in block 102, the processor may check whether other resource LPM flags that are required by a low power resource mode are also set to the required values.

In a further aspect, such as may be applicable for use with virtual resources, the determination of whether a resource is available for being placed into a low power resource mode may depend upon LPM flags being set for other resources. For example, if a virtual resource 'C' exists for which are defined low power resource modes '3' and '4', it could be that the availability of low power mode '3' depends on the LPM mask bit for resource 'A' while the availability of low power mode '4' would depend on the LPM mask bit for resource 'I'. Thus in this example, the availability of placing virtual resource 'C' in a low power mode explicitly depends on an LPM mask bit for resource 'C' since it is a virtual resource that goes into one of low power modes '3' or '4' depending on state of resources 'A' and 'I'. Thus, in an aspect, the processor may select resources for evaluation by considering the LPM mask bits in both blocks 100 and 102.

In determination block 104, the processor may compare the selected resource low power resource mode latency with the latency budget (which was determined in step 30 described above) to determine whether the low power resource mode would be compatible with the current system latency requirements. If the exit latency of the selected low power resource mode of the selected resource exceeds the latency budget (i.e., determination step 104="No"), the processor may determine whether there is another low power resource mode for the selected resource in determination block 112. If, on the other hand, the exit latency of the selected low power resource mode of the selected resource is within the latency budget (i.e., determination step 104="Yes"), the processor may add the power savings associated with the selected low power resource mode to the power savings for the selected mode to obtain a new net savings (i.e., estimated power savings for the low power configuration including the low power mode being evaluated) in step 106. In other words, the projected power savings of the selected low power resource mode may be added to the power savings of other resource low power resource modes that have already been evaluated to determine a net power savings that would be provided by the set of low power resource modes including the particular resource low power resource mode being evaluated. In an aspect, the projected power savings for each low power resource mode may be determined as the product of the potential power savings per unit time (or as a function of time) at a current temperature (and/or other operating conditions) times the expected idle time, or some function. In determination block 108, the processor may compare the sum obtained in block 106 to the total power savings of a previously selected best set of low power resource modes to determine if including the selected resource low power resource mode results in greater power savings. If the combination including the selected resource low power resource mode results in greater power savings (i.e. determination block 108="Yes"), the computing device may include the selected low power resource mode for the resource in the selected set of low power resource modes in block 110.

If the combination including the selected resource low power resource mode results in less power savings (i.e. determination block 108="No"), the processor may determine whether there is another low power resource mode for the selected resource in determination block 112. If there is another low power resource mode associated with the selected resource (i.e., determination block 112="Yes"), the processor may return to block 102 to select the next low power resource mode for evaluation. If all low power resource modes of the selected resource have been evaluated (i.e., determination block 112="No"), the processor may determine whether there is another resource which can be placed in a low power resource mode in determination block 114. If there is another resource to be evaluated (i.e., determination block 114="Yes"), the processor may return to block 100 to select the next resource for evaluation. Once all resources have been evaluated (i.e., determination block 114="No") the algorithm should have identified an optimum set of low power resource modes to implement, so it may proceed to implement the selected set of low power resource modes as described above with reference to FIG. 4 and block 40.

While a combinatorial computation algorithm, such as that which is illustrated in FIG. 7, may be able to identify an optimum set of low power resource modes for a given operating condition, such calculations may be computationally too difficult to implement, particularly when expected idle times may only be a few milliseconds and the number of resources is large. Therefore, in various aspects, approximate solutions to the knapsack problem and solutions which can be determined in advance may be implemented. An example of a solution that may be determined by the processor in advance of a sleep cycle is one which uses a table lookup method. In a table lookup method, the performance of various low power resource modes may be calculated by the processor at runtime (i.e., not defined in advance by a developer), in terms of expected idle time, temperature, current system configuration, and other parameters. The results of these calculations may be provided in the form of a table or graph that can be used by the processor to quickly identify an approximately optimum set of low power resource modes at the time of a sleep cycle.

Figure 8A:
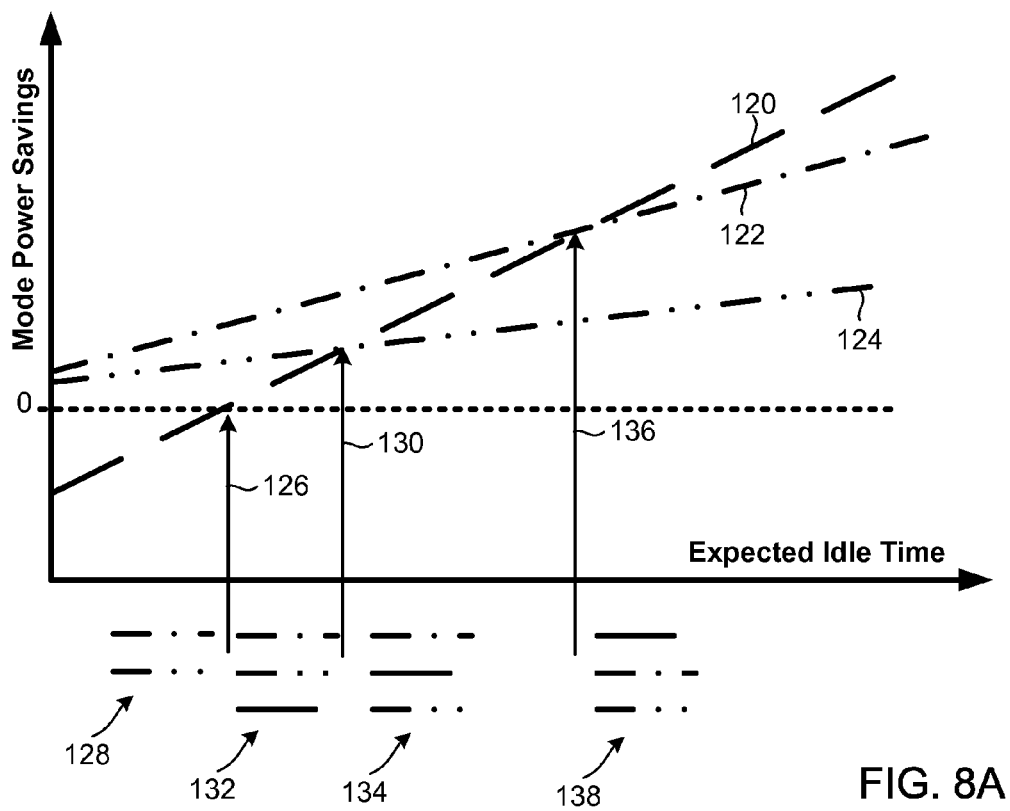
FIGS. 8A and 8B are power savings versus idle time graphs of three alternative low power modes illustrating an aspect method for selecting an optimum low power mode based upon expected idle time.

FIG. 8A illustrates a one-dimensional graph of three alternative sets of operating low power configurations 120, 122, 124 plotted in terms of power savings versus expected idle time. As the graph reveals, the three alternative low power configurations may yield different relative power savings at different ranges of expected idle times. FIG. 8A illustrates that alternative low power configuration 120 results in negative power savings initially (e.g., from the initiation of idle time until the time indicated by arrow 126), but positive power savings later in time. Thus, between the initiation of a processor sleep cycle and the time indicated by arrow 126, only low power configurations 122 and 124 result in power savings, as indicated by element 128. FIG. 8A also illustrates that, in the period between the initiation of a sleep cycle and the time indicated by arrow 126, low power configuration 122 would provide greater power savings than low power configuration 124. From the time between arrow 126 and arrow 130, all three low power configurations would yield positive power savings, with low power configuration 122 providing the most power savings potential, followed by 124 and 120, respectively. This is illustrated by element 132, which show that the low power configuration 122 has a higher power savings than 124, which in turn has a higher power savings than 120. In the time frame between arrow 130 and arrow 136, all three low power configurations yield positive power savings, with the three alternatives providing power savings potential in the order of 122, 120 and 124, as indicated by element 134. After the time indicated by arrow 136, the three alternatives have a power savings potential in the order of 120, 122 and 124, as indicated by element 138.

In the aspect illustrated in FIG. 8A, the processor can determine a prioritized order of alternative low power configurations using the expected idle time as a look up value. While FIG. 8A illustrates this aspect in a two-dimensional graph (i.e., power savings vs. expected idle time), the aspect method may be implemented with a multi-dimensional graph, including parameters such as temperature, latency, etc. In an aspect, the processor may utilize known three-dimensional graphing analysis algorithms to identify an approximately optimal low power configuration or prioritized order of configurations based upon multiple parameters. Again, such graphing may be performed by the processor at run time, and not defined in advance by a developer.

Figure 8B:
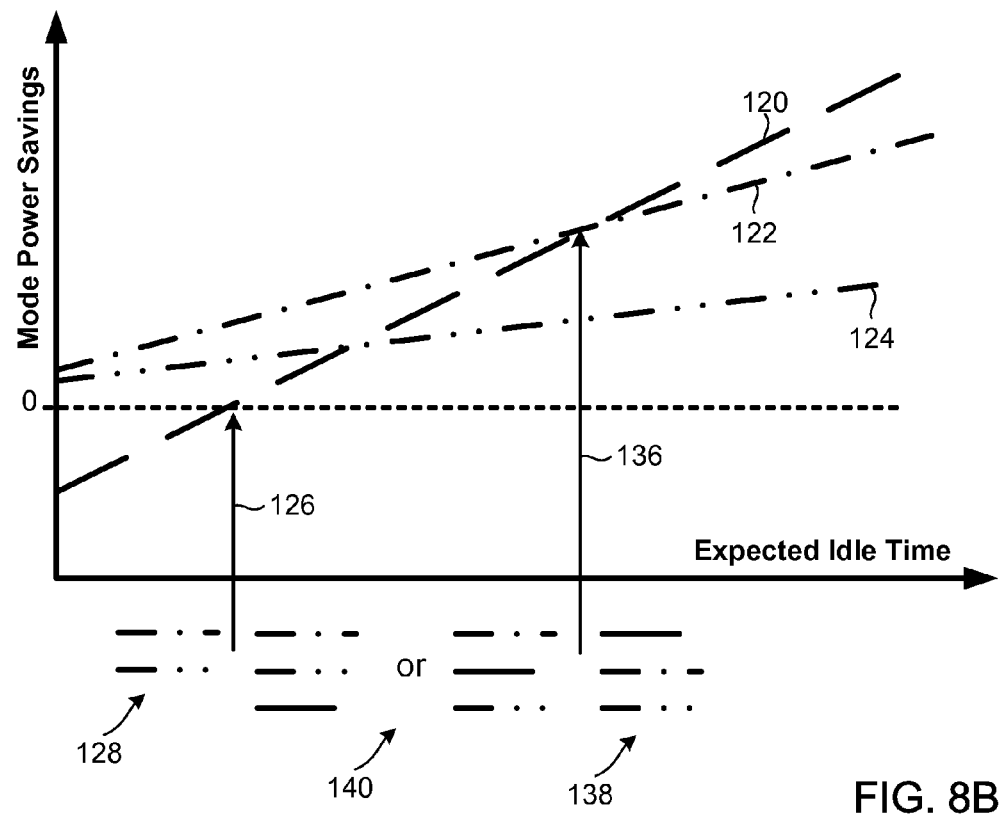

Even though pre-computation reduces the work required in the lookup process, the number of transition points increase along with the number of different low power modes (which is tied to the number of different resources) and the number of dimensions (i.e., parameters used in selecting the optimal system low power mode configuration). In such cases, the space necessary to store such a lookup table may become prohibitive. Thus, in a further aspect, heuristics may be used to consolidate different regions of the lookup table to reduce the number of discrete regions that need to be tracked, thereby reducing the size of the lookup table. FIG. 8B shows an example aspect in which the ranked order of low power configurations may be presented in the form of one or two alternative ranking lists (illustrated by 140) in some regions of input parameters (e.g., the region between arrows 126 and 136). FIG. 8B illustrates that consolidating the different regions may produce suboptimal results for some sets of conditions. For example, in the time region between arrows 126 and 136, the optimal results for the area closest to arrow 126 differ from the optimal results for the area closes to arrow 136. To mitigate the impact of these suboptimal results, in various aspects, the processor may place the incorrect rankings into regions that are relatively uninteresting. Regions may be classified as uninteresting if they describe conditions that are infrequently experienced (e.g., temperature extremes). In various aspects, the processor may determine that the suboptimal results are acceptable by evaluating the error in the non-optimal rankings, and determining the errors to be minimal, or below some set threshold. The development of such heuristic rules may be performed by the processor at run time, and not defined in advance by a developer.

As an extension of this aspect, the processor may gather statistics on which conditions the device most frequently experiences, and recompute the lookup tables, as described more fully below, to customize the tables to the conditions most frequently experienced by the particular computing device. For example, a cellular telephone used in Alaska may compute a lookup table that allocates more of its table space to cold temperature regions compared to a cellular phone used in the Sahara. This aspect allows each computing device to make low power configuration decisions that are optimized to its typical conditions in terms of both environment (i.e., temperature) and measured use patterns (e.g., expected idle time).

Figure 9A:
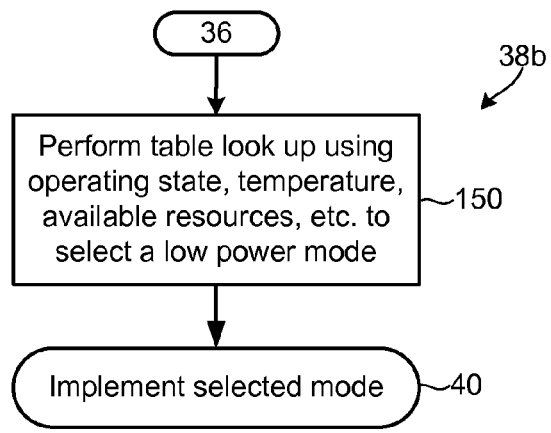
FIGS. 9A and 9B are process flow diagrams of alternative aspect methods for selecting an optimum low power mode.

FIG. 9A illustrates an aspect method 38b for implementing a table look up method for the solver process described above. In method 38b at block 150 the processor may use the parameters determined in blocks 28-36 (as described above with reference to FIG. 4) to select a low power configuration. As mentioned above, in an aspect, this table look up process may involve the use of a 3-D mapping analysis algorithm. Once an optimum low power configuration is identified, the processor may enter the selected mode in step 40 as described above.

Figure 9B:
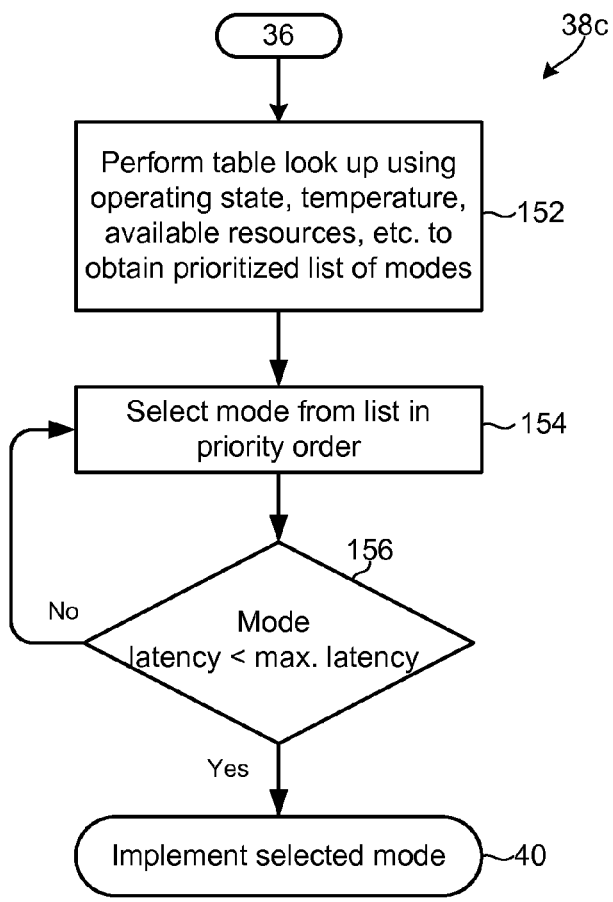

FIG. 9B illustrates an alternative aspect method 38c for implementing a table look up method that yields a ranked list of alternative configurations for further evaluation. In method 38c at block 152, the processor may use the parameters determined in blocks 28-36 (as described above) to obtain a ranked list of alternative low power configurations based upon potential power savings. In block 154 the processor may select a highest ranked alternative low power configuration for evaluation. In determination block 156, the processor may determine whether the mode exit latency of the selected configuration is less than the maximum acceptable system latency. If the latency of the selected low power configuration satisfies the system requirement (i.e., determination block 156="Yes"), the processor may enter the selected mode in step 40 as described above. If the latency of the selected low power configuration does not satisfy the system latency requirement (i.e., determination block 156="No"), the processor may select the next low power configuration for evaluation. This process may continue until all unacceptable low power configurations are eliminated, or until one or more low power configurations that satisfy the system latency requirements are identified. If all of the low power configurations are eliminated, or no satisfactory low power configuration is identified, the processor may make a determination as to whether it should enter a low power configuration or remain in an operating state based on the expected power savings available, operational requirements, and other factors described above.

Figure 10:
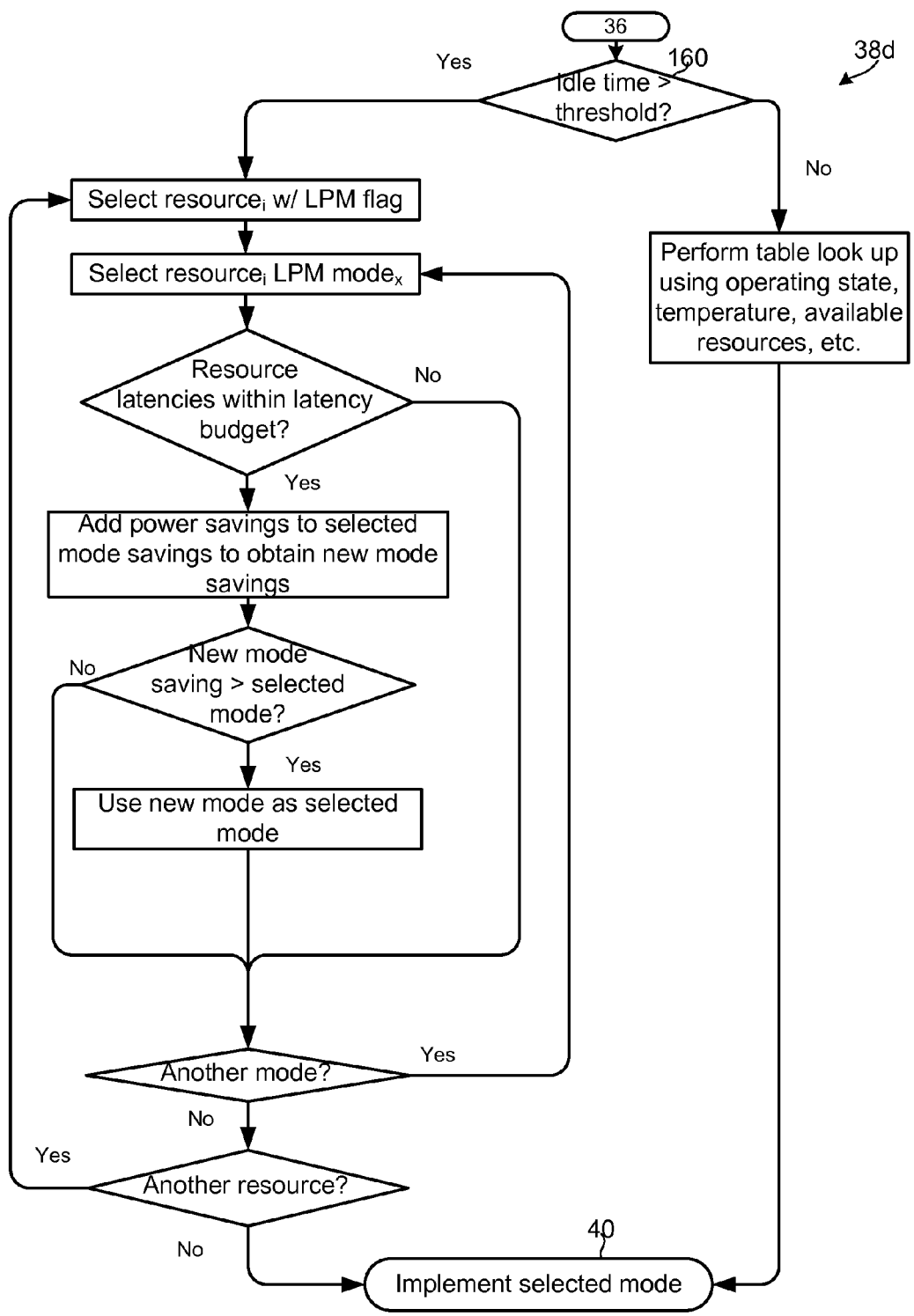
FIG. 10 is a process flow diagram of an alternative aspect method for selecting an optimum low power mode.

The table lookup solver approach described above can provide a flexible data-driven approach for eliminating system low power configurations and identifying one or more optimum low power configurations that can be computed relatively quickly. However, in certain situations, this approach may not be able to identify an optimum low power configuration in all operating states and conditions, because it is based upon calculations made in advance. FIG. 10 illustrates an alternative aspect method 38d that may be implemented to make use of both the combinatorial computation algorithm method and the table look up method depending upon the expected idle time. In determination block 160 the processor determines whether the expected idle time is going to be sufficiently long (i.e., longer than a predetermined threshold) to justify the calculation time required to directly determine an optimum configuration, or whether a faster, table lookup method, should be implemented. If the processor determines that the expected idle time exceeds the threshold and thus justifies the extra computing time required to complete the more rigorous solver algorithm (i.e., determination block 160="Yes"), the processor may perform the algorithm described above with reference to FIG. 7 to determine the optimum low power configuration to implement in block 40. On the other hand, if the processor determines that the expected idle time is less than the threshold (i.e., determination block 160="No"), the processor may perform the table lookup method described above with reference to FIG. 9A or 9B. In this manner, the computing device can have the benefit of both solver methods depending upon the time that the processor is expected to remain in the idle state.

In an aspect, the computing device may occasionally re-compute the lookup tables used in the solver for determining an optimum low power configuration for a range of conditions and states in order to make use of statistical information gathered regarding the operation of the computing device. By periodically re-computing features of the lookup tables, this aspect enables the computing device to learn from its current and past operations in order to better optimize the potential power savings achieved by future low power configurations. To compute the lookup tables, the computing device may be configured to evaluate the relative power savings achievable for each of the various operating conditions (e.g., different temperature conditions and different client and application states) and each of the different resources and resource low power modes. Such calculations may be similar to those described above with reference to FIG. 7, and may be performed by the processor for a number of different system configurations and temperature and other operating condition values.

In various aspects, the computing device processor may be configured to compute the look up tables as a background task. That is, since the calculations are likely to involve a significant amount of processing, they may be configured to be performed when the processor is not involved in performing higher priority operations. For example, the computing device may be configured to perform the calculations when one or more processors would otherwise be in an idle state. Since such calculations are likely to consume significant power, the computing device may be further configured to perform these calculations only when the device is plugged into external power (e.g., when charging the battery), and thus when power conservation is not an operating priority and power consumption is not an issue.

Figure 11:
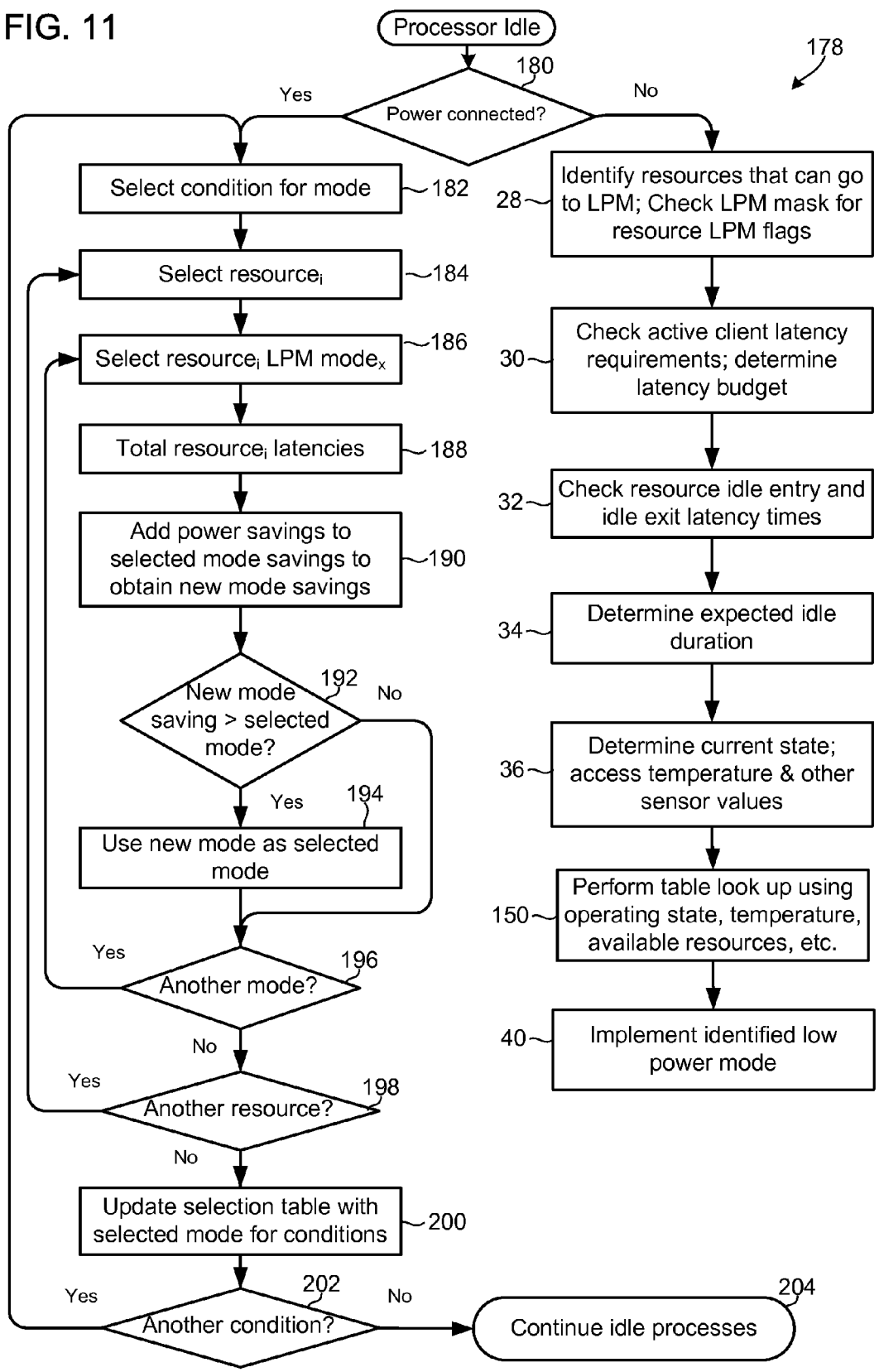
FIG. 11 is a process flow diagram of an alternative aspect method for selecting an optimum low power mode or updating a low power mode selection table based upon whether the computing device is connected to external power.

FIG. 11 illustrates an aspect method 178 for calculating the lookup tables when the computing device is connected to external power. In method 178 at determination block 180, the processor may determine whether the device is connected to external power when the processor enters an idle state. If the processor determines that the device is not connected to external power (i.e., determination block 180="No"), the processor may perform the processes described above with reference to FIGS. 4 and 9A to identify an optimal low power configuration and enter the set of low power resource modes making up the low power configuration in block 40. If the processor determines that the device is connected to external power (i.e., determination block 180="Yes"), the processor may perform computations required to update the lookup tables. At block 182, the processor may select a particular operating state and condition for calculating the optimum low power configuration. In block 184, the processor may select a first resource for evaluation, and in block 186, select a first low power resource mode for the selected resource. In block 188, the processor may determine the total resource latencies of a low power configuration including the selected mode using the latency of the selected low power resource modes. In block 190, the processor may add the power savings associated with the selected low power resource mode to power savings associated with a selected set of low power modes to obtain a new mode power saving.

In determination block 192, the processor may determine whether the new mode power savings exceeds the savings of a previously selected low power configuration. If the selected low power resource mode results in an increase in power savings (i.e., determination block 192="Yes"), the processor may use the selected low power resource mode in a provisional low power configuration in block 194. Thereafter, or if the selected low power resource mode does not result in an increase in power savings (i.e., determination block 192="No"), the processor may determine whether there is another low power resource mode associated with the selected resource in determination block 196. If there is another low power resource mode associated with the resource (i.e., determination block 196="Yes"), the processor may return to block 186 to select the next low power resource mode for the selected resource. If all low power resource modes for the selected resource have been evaluated (i.e., determination block 196="No"), the processor may determine whether there is another resource to be evaluated for the current selected conditions in determination block 198.

If the processor determines that there is another resource to be evaluated (i.e., determination block 198="Yes"), the processor may return to block 184 to select the next resource for evaluation. If the processor determines that all resources have been evaluated for the currently selected conditions (i.e., determination block 198="No"), the processor may update the selection table in block 200 with the prospective low power configuration, including values for the potential savings determined in block 190 and the latencies of the various low power resource modes determined in block 188. Thereafter, the processor may determine whether there is another condition to be evaluated in determination block 202. If the processor determines that another condition remains to be evaluated (i.e., determination block 202="Yes"), the processor may return to block 182 to select the next condition to be evaluated. Once all conditions have been evaluated and the lookup table has been updated accordingly (i.e., determination block 202="No"), the processor may continue with normal idle processes appropriate for the current condition (including being connected to external power) in block 204.

Figure 12:
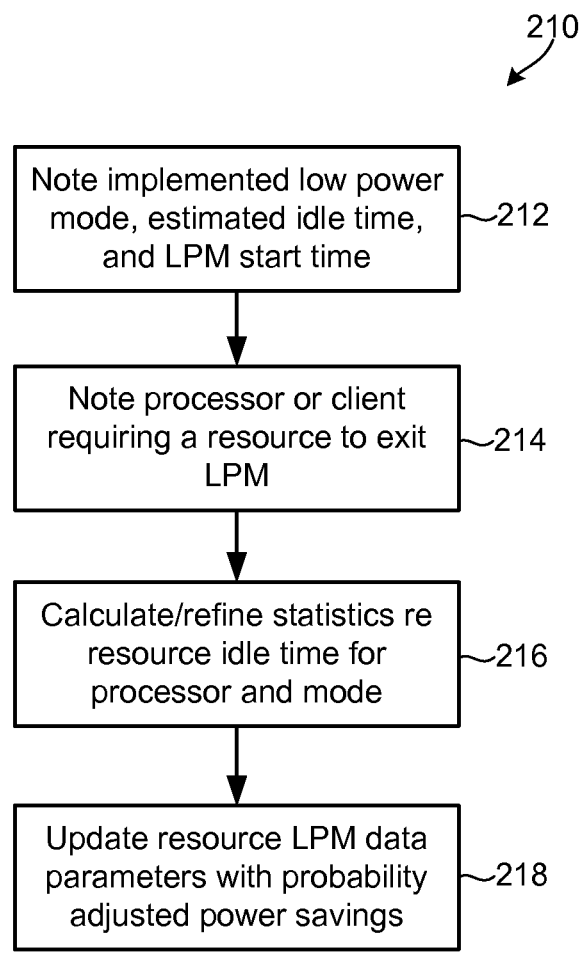
FIG. 12 is a process flow diagram of an aspect method for updating power saving parameters of resources based upon statistics gathered by the mobile device.

In a further aspect, the processor may be configured to take note of operational statistics in order to adjust the parameters used to determine the optimum low power configuration. As illustrated in FIG. 12, in aspect method 210 at block 212, the processor may note the implemented low power configuration, the estimated idle time used in determining the low power configuration, and the start time of the low power configuration. When the processor exits the low power configuration (i.e., wakes up), the processor may note the time that the processor exits the low power configuration, the required resources, and the processor or client requiring the resources that prompted the wakeup event in block 214. In block 216, the processor may use the information obtained in block 214 to calculate or refine statistics regarding the resource idle time for the particular resource, processors, clients, and/or low power configuration. Such statistics may address how accurate the expected idle time estimation tends to be, such as to generate a correction factor, identify particular processors or clients which initiate wakeup events, and identify idle time characteristics of particular low power configurations. In block 218, the processor may update the resource low power resource mode data parameters with probabilities or correction factors for latencies, expected idle time estimations, or adjusted power savings based upon the usage statistics calculated in block 216. In this aspect, a wide range of statistics may be gathered regarding the typical operations of the computing device, with the resulting information used to enable the solver module to better determine the most appropriate low power configuration. In this manner, the computing device may adapt to its typical usage and operating conditions in order to further optimize the power that may be saved by implementing low power resource modes and/or a low power configurations.

In various aspects, a processor may be able to use statistics regarding normal functioning of different processors in order to select low power configurations that yield greater power savings on average than the configuration that would otherwise be selected based upon the resource parameters and processor operating state. This may be clarified by reference to an example in which, for a given idle period, a processor A can choose between the low power mode for either (shared) resource S or (local) resource L, but has dynamic latency requirements that disallow entering both low power modes (i.e., for this particular idle period, the modes are functionally mutually exclusive). In absolute terms, resource S would save more power by placing resource S in a low power state, but there is a non-zero probability that processor B will require resource S during processor A's idle time. Depending on how long resource S is used by processor B, the optimal low power state for processor A might be to enter a low power resource mode for resource L, even though in theory it saves less power. To account for this, the power model for resource S could be de-rated by the probability that it will be globally idle, given that processor A is idle while processor B is not. That is, instead of the power model calculation for resource S being power_model(idle, temp), the calculation may become E[power_model(idle, temp)|Proc A idle]. In various aspects, the probability distribution for the expectation calculation may be statically defined, either by fiat, by profiling, or empirically determined at runtime by gathering actual usage statistics.

The process of applying learning algorithms to gather statistical information regarding conditions, performance, durations, and other characteristics associated with the implementation and performance of low power configurations may be applied generally to enable the power savings performance of low power configurations to be optimized to the characteristics of a particular computing device, as well as the usage patterns of a particular user. To accomplish such learning, the processor may perform statistical analysis algorithms using the various data obtained from low power mode operations in order to adjust mode selection methods, resource performance values, and otherwise adjust the algorithms implemented in the solver in order to reflect information obtained from monitoring device operations.

Figure 13:
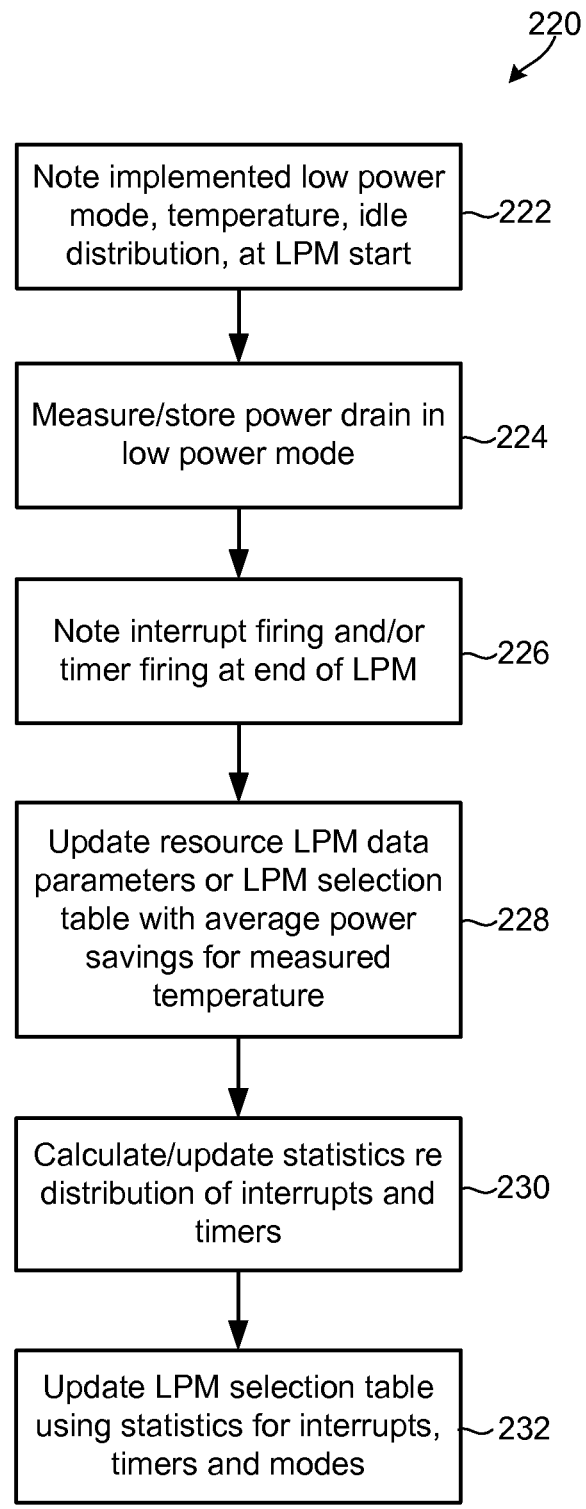
FIG. 13 is a process flow diagram of an aspect method by which a mobile device may gather statistics on power savings achieved by various low power modes as well as statistics regarding the distribution of interrupts and timers impacting idle mode power savings.

In a further aspect method 220 illustrated in FIG. 13, a processor may be configured to gather statistics regarding the actual power savings achieved by various low power configurations in order to base the mode selection on actual device power consumption characteristics. In block 222, the processor may note the particular low power configuration to be entered, the device temperature, the expected idle time, and the time at the start of an idle state. In block 224, the processor may measure and store the actual power drain through the system when it has entered the selected low power configuration. This measurement may be conducted at the start of the low power state, throughout the idle cycle, or at the end of the idle cycle, such as part of the process of exiting the idle state. In step 226, the processor may note the interrupt firing and/or timer firing at the end of the low power state. In block 228, the processor may update the resource low power resource mode data parameters and/or low power resource mode selection table to reflect the actual power savings achieved in the particular low power configuration at the current temperature based upon the information gathered in block 222-226. In block 230, the processor may calculate or update statistics regarding the distribution of interrupts and timer firings, and use this information to update the low power resource mode selection table in block 232. In this manner, the parameters used by the processor to select the optimum low power configuration based upon configuration and operating condition data can be refined based on actual device performance. The power savings achievable in various low power resource modes may vary depending upon temperature, production run, age, specific component configuration, and many other factors which cannot be anticipated in advance. Further, this aspect enables the processor to refine the calculations or low power resource mode selection tables used to select idle operating configurations based on actual use. Thus, if a computing device typically experiences cold temperatures (e.g., the owner of the computing device lives in Alaska) the low power resource mode selection table may be refined to provide greater granularity within the temperature range typically experienced by the computing device, rather than attempting to cover the full potential range of temperatures that the device might experience in other locations. Thus, this aspect method enables the processor to determine an optimum low power configuration based upon the actual performance characteristics of the device at the time, and under the conditions, of operation.

Figure 14:
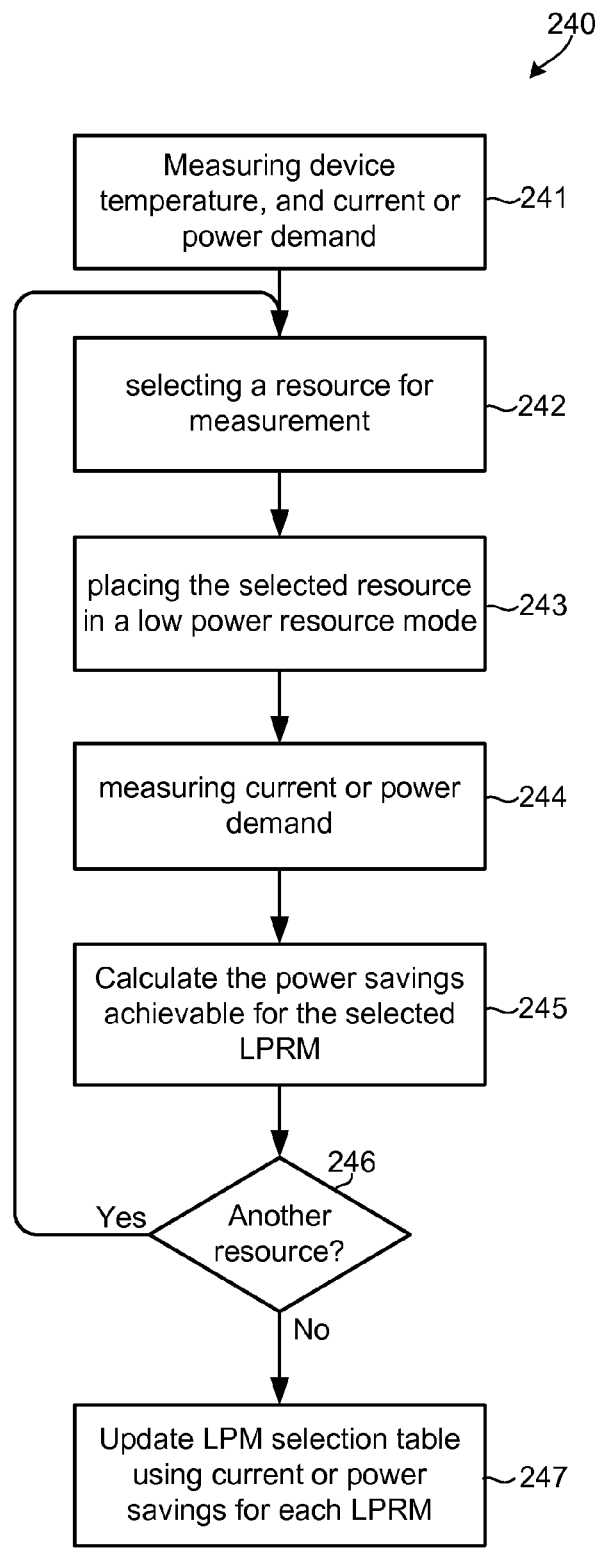
FIG. 14 is a process flow diagram of an aspect method by which a mobile device may gather measure power savings achieved by each low power resource mode.

In a further aspect method 240 illustrated in FIG. 14, a processor may measure power savings characteristics of each low power resource mode (i.e., each low-power mode of each resource) by selectively implementing each mode and measuring the resulting change in current or power demand. By measuring actual power savings achieved by each low power resource mode, the computing device can gather statistics useful for selecting an optimum system low power mode configuration. Since configuration changes and device age can affect the power savings achieved by particular low power resource modes, this method enables the computing device to make system low power configuration decisions based upon the current operating configuration and conditions, which may have changed since the device was manufactured. Such measurements may also be performed at different temperatures in order to obtain or update information on the temperature sensitivities of the power savings potential of the various low-power resource modes.

Referring to FIG. 14, in method 240 in block 241, when the computing device processor determines that it is in a known stable state and in an operating condition that is conducive to conducting the measurements, the processor may measure the device temperature and current or power demand using sensors included within the device. In this block, the processor may measure other operating conditions that may influence the power savings achievable with each low power resource mode. In block 242, the processor may select for measurement a resource having a low power mode. In block 243, the processor may place the selected resource in a selected one of its low power resource modes. In block 244, the processor may then measure the system current or power demand with the low power resource mode implemented. In block 245, the processor may calculate the power savings achieved by placing the selected resource in the selected low-power resource mode. This may be accomplished by subtracting the power measured in block 244 from the initial power measured in block 241. In determination block 246, the processor may determine whether there is another resource to measure. If so (i.e., determination block 246="Yes"), the processor may return to block 242 to select the next resource for measurement. Once all resources have been selected and the corresponding low power resource mode power savings measured (i.e., determination block 246="No"), the processor may use the measured power savings to update the low power mode selection table in block 247. The updated low power mode selection table may be used for selecting a system low power mode configuration the next time that the processor enters a sleep cycle. In an aspect, method 240 may be repeated periodically, especially when the processor notes that the system temperature is different than in a previous measurement process. By measuring the power savings achieved by each of the low power resource modes at different temperatures, the processor can calculate or estimate temperature sensitivities of the power savings potential of each low power resource mode through well known arithmetic analyses, such as curve fitting algorithms. Such temperature sensitivities may then be used in the process of selecting low-power resource modes to be implemented in a system low power mode configuration.

The various aspects provide a number of useful benefits to users and developers beyond merely saving additional battery power. As one benefit, the low power resource modes of various resources and their definitions are mostly independent of the code that implements the modes. The relevant driver calls may be included within the "enter" and "exit" functions, so the low power resource mode is not affected. The solver process (i.e., block 38 in method 26 described above) may take care of determining when the low power resource mode should be entered or exited based upon hard data, such as the power and latency data for each low power resource mode and the dynamic restrictions (e.g., latency requirements) and operating conditions present in the current operating state. Thus, the developer does not have to try to anticipate combinations of such parameters in order to hard-code suitable low power resource modes into the device.

Another benefit of the aspects described above is that the computing device is not required to select a single defined low power resource mode from a preconfigured or predefined set of system modes, but can select a combination of low power resource modes to dynamically implement a low power configuration for the system based upon the current operating state, resources, operating condition, estimated sleep cycle, device configuration, etc. This is advantageous because prior known power management systems are configured to select between a set of predefined low power configurations (e.g., one of mode 1, mode 2, or mode 3), whereas the aspects described above enable a device to dynamically select one or more low power resource modes for each resource available for entering a low power mode, providing much greater flexibility to implement system low power configurations best suited to current conditions and states. For example, assume a particular processor has three resources A, B and C having low power resource modes A', B' and C' respectively. The low power resource modes may have different latencies, such as low power resource mode A' may have 0.4 ms of latency, low power resource mode B' may have 0.5 ms of latency, and low power resource mode C' may have 0.6 ms of latency. If a USB client is active so that there is a 1 millisecond latency requirement on the system (e.g., a 1 ms worst case permissible latency), low power modes of resources A, B and C can be enabled or disabled independent from each other so long as the combination of selected low power modes meets the worst case latency requirement. For example, if the processor goes into an idle state and resources A, B and C are all enabled, the system can pick low power resource mode A' (0.4 ms of latency), low power resource mode B'(0.5 ms of latency), low power resource mode C' (0.6 ms of latency), modes A and B (0.9 ms of latency), or modes A and C (1 ms of latency). Thus, in the various aspects, a solver task may pick the best set of low power resource modes to save the most power given the 1 ms worst case latency tolerance.

Additionally, typical power management systems require that the clients have an inactive mode and an active mode, and the latency tolerance is dependent on a current performance state. In the various aspects described above, the client mechanisms can be "present" or "not present" rather than "active" or "inactive". That is, in the various aspects, the various low power resource modes may be traversed to eliminate possible states, rather than being selected based on an operating state (e.g., active or inactive). Further, the various aspects enable clients to create, register and/or ignore low power resource modes for the various resources and to dynamically select a combination of low power resource modes to enable a large number of possible system low power configurations. This allows the system clients to further control, and fine tune, the low power states of the device.

Another benefit of the aspects described above is that the computing device processor does not need to be aware of the various operating modes of the system clients. In the various aspects, clients may directly submit only their latency tolerance. As such, the processor does not need to know about the various details associated with operation states of each client. The processor needs to only know the registered latency tolerances of the clients, and select low power resources to enter a low power resource mode based on the reported latency tolerances. In the various aspects, the setting of the tolerances and the low power modes may be by discrete entities. For example, a USB client may set a latency tolerance but not necessarily a low power mode. Each low power resource mode may have a set of signaling mechanisms to indicate whether they can be entered on any given sleep cycle that is completely independent from the latency consideration.

As a further benefit, a new NPA programming node may be provided in an aspect to enable clients to specify how long they expect to be asleep. For example, NPA programming node "/core/processor/wakeup" may be provided to enable clients to specify that they expect to be asleep (i.e., not utilizing the processor or resources) for no longer than "X" microseconds (up to 71 hours). Such a programming capability may simplify the development of client applications for compatibility with processor idle states and low power configurations.

In a further aspect, the results of the solver calculations, such as described above with reference to FIG. 7, maybe cached in memory so that the optimum low power configuration may be reused without having to re-perform the solver algorithm when the same or similar operating conditions (e.g., operating state, temperature, and latency restrictions) are present at the time that an idle state may be entered. In this way, the processor can quickly enter the idle state by skipping the process of performing the solver algorithm while still achieving optimum or near optimum power savings. In a further aspect, the operating state and conditions may be statistically analyzed so that cached optimum low power configurations may be linked to statistically determined ranges of conditions and states.

Figure 15:
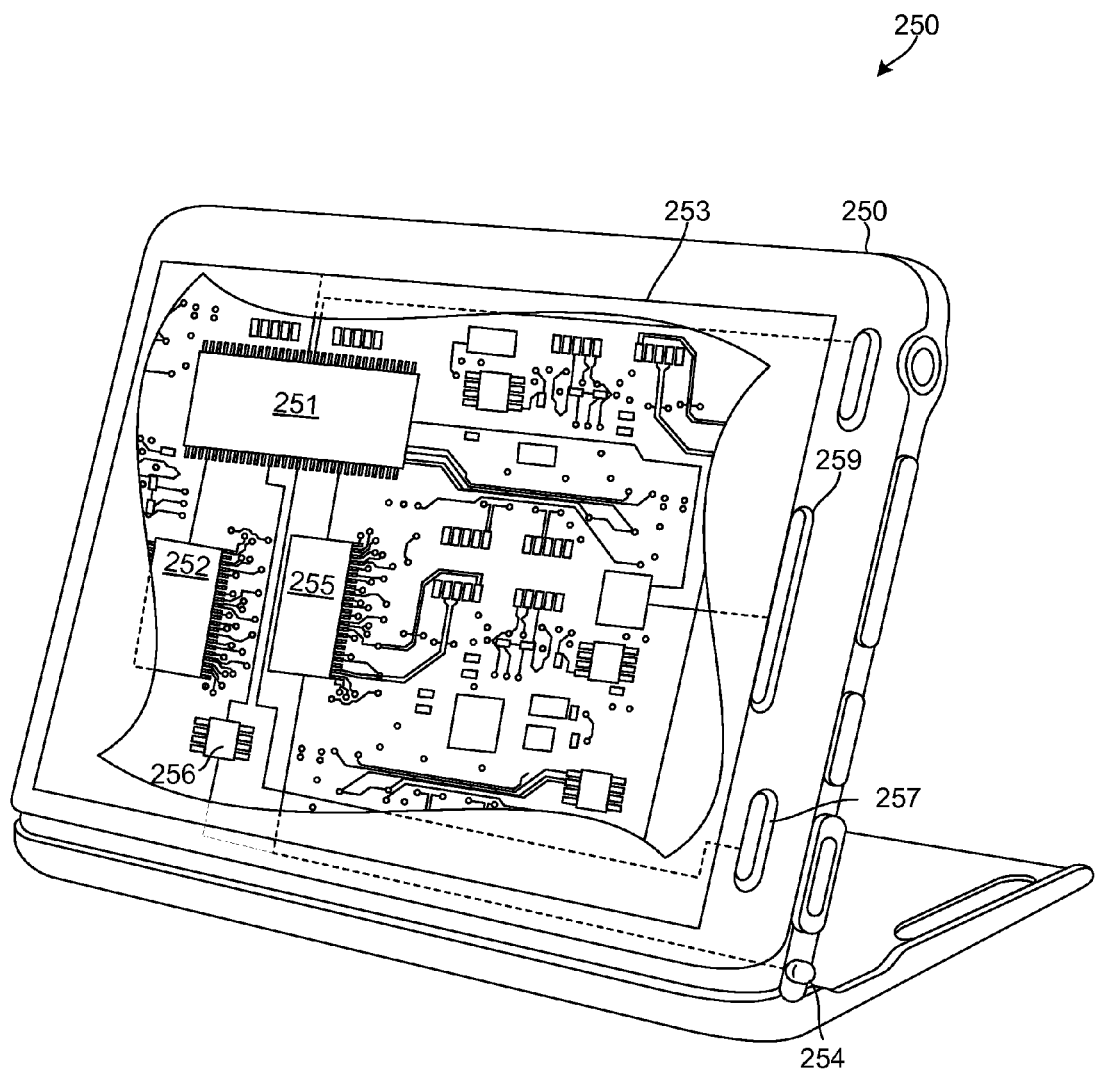
FIG. 15 is a component block diagram of a mobile device suitable for use in an aspect.

Typical mobile devices 250 suitable for use with the various aspects will have in common the components illustrated in FIG. 15. For example, an exemplary mobile receiver device 250 may include a processor 251 coupled to internal memory 252, a display 253, and to a speaker 259. Additionally, the mobile device 250 may have an antenna 254 for sending and receiving electromagnetic radiation that is connected to a mobile multimedia receiver 256 coupled to the processor 251. In some aspects, the mobile multimedia receiver 256 may include an internal processor, such as a digital signal processor (DSP) for controlling operations of the receiver 256 and communicating with the device processor 251. Mobile devices typically also include a key pad or miniature keyboard and menu selection buttons or rocker switches 257 for receiving user inputs.

The processor 251 may be any programmable microprocessor, microcomputer or multiple processor chip or chips that can be configured by processor-executable software instructions (applications) to perform a variety of functions, including the functions of the various aspects described herein. Also, the functions of the various aspects may be implemented in a DSP processor within the receiver 256 configured with DSP-executable instructions. Typically, software applications and processor-executable instructions may be stored in the internal memory 252 before they are accessed and loaded into the processor 251. In some mobile devices, the processor 251 may include internal memory sufficient to store the application software instructions. In some mobile devices, the secure memory may be in a separate memory chip coupled to the processor 251. In many mobile devices 250, the internal memory 252 may be a volatile or nonvolatile memory, such as flash memory, or a mixture of both. For the purposes of this description, a general reference to memory refers to all memory accessible by the processor 251, including internal memory 252, removable memory plugged into the mobile device, and memory within the processor 251 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for conserving power in a computing device, comprising:
    setting a flag bit associated with a resource in a low power mode mask when the resource is not in use, wherein the resource is one of a plurality of resources;
    identifying the resources of the plurality of resources that may be placed in a low power resource mode based upon flag bit settings in the low power mode mask when a processor of the computing device is able to enter an idle state;
    determining a time that the processor is expected to remain in the idle state;
    registering a latency requirement for each of the identified resources in the low power mode mask;
    determining a latency budget for the computing device;
    evaluating on the computing device low power modes for each of the identified resources in the low power mode mask to eliminate any of the low power resource modes, or any combination of the low power resource modes, that have a combined latency requirement that exceeds the latency budget;
    determining potential power savings of each of the evaluated low power resource modes based upon a potential power savings per unit time at a current temperature times the determined expected idle time;
    selecting, by the processor, a combination of the low power resource modes that maximizes the potential power savings and has a total latency requirement that is less than or equal to the latency budget; and
    entering the selected combination of the low power resource modes by executing an enter function of each of the selected low power resource modes on each of the identified resources.

2. The method of claim 1, wherein selecting the combination of the low power resource modes further comprises executing a knapsack problem solution algorithm for the various low power resource modes and the resources.

3. The method of claim 1, wherein evaluating on the computing device the low power resources modes for each of the identified resources in the low power mode mask to eliminate any of the low power resource modes, or any combination of the low power resource modes, that have the combined latency requirement that exceeds the latency budget is based at least in part on a table look up process using a low power mode selection data table using a potential power saving, an estimated idle time, and operating conditions.

4. The method of claim 3, wherein the operating conditions include a temperature value.

5. The method of claim 3, further comprising:
    gathering statistics regarding operating conditions on the computing device; and
    updating the low power mode selection data table based upon the gathered operating conditions statistics.

6. The method of claim 5, wherein the operating conditions are selected from the group including temperature, power consumption of particular low power resource modes, idle times experienced in various operating states, and typical device usage patterns.

7. The method of claim 5, further comprising determining whether the computing device is connected to external power, wherein updating the low power mode selection data table based upon the operating conditions statistics is accomplish in response to determining the computing device is connected to the external power.

8. A method for conserving power in a computing device, comprising:
    measuring, when the computing device is in a known stable state, temperature and current, or temperature and power demand;
    selecting a resource for measurement;
    placing the selected resource in a low power resource mode;
    measuring current or power demand while the selected resource is in the low power resource mode;
    repeating steps of selecting a next resource, placing the selected resource in a low power resource mode and measuring current or power demand while the selected resource is in the low power resource mode until current or power demand during a low power resource mode has been measured for all resources having a low power resource mode;

setting a flag bit associated with a resource in a low power mode mask when the resource is not in use, wherein the resource is one of a plurality of resources;

identifying the resources of the plurality of resources that may be placed in a low power resource mode based upon flag bit settings in the low power mode mask when a processor of the computing device is able to enter an idle state;

registering a latency requirement for each of the identified resources in the low power mode mask;

determining a latency budget for the computing device;

evaluating on the computing device the low power resource modes for each of the identified resources in the low power mode mask to eliminate any of the low power resource modes, or any combination of the low power resource modes, that have a combined latency requirement that exceeds the latency budget;

using the measured current or power demand associated with each of the low power resource modes to determine potential power savings of a combination of the low power resource modes;

selecting, by the processor, a combination of the low power resource modes that maximizes the potential power savings and has a total latency requirement that is less than or equal to the latency budget; and entering the selected combination of the low power resource modes by executing an enter function of each of the selected low power resource modes on each of the identified resources.

9. The method of claim 8, further comprising:

repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 4 at different temperatures; and determining a temperature sensitivity of the current or power demand associated with each of the low power resource modes, wherein selecting the combination of the low power resource modes that maximizes potential power savings and has the total latency requirement that is less than or equal to the latency budget comprises:
measuring a temperature of the computing device; and
selecting a combination of the low power resource modes that maximizes the potential power savings and has the total latency requirement that is less than or equal to the latency budget using the determined temperature sensitivity of current or power demand associated with each of the low power resource modes to determine the potential power savings of the combination of the low power resource modes at the measured computing device temperature.

10. A computing device having at least one processor, comprising:
means for setting a flag bit associated with a resource in a low power mode mask when the resource is not in use, wherein the resource is one of a plurality of resources;
means for identifying the resources of the plurality of resources that may be placed in a low power resource mode based upon flag bit settings in the low power mode mask when the at least one processor is able to enter an idle state;
means for registering a latency requirement for each of the identified resources in the low power mode mask;
means for determining a time that the processor is expected to remain in the idle state;
means for determining a latency budget for the computing device;
means for evaluating on the computing device low power resource modes for each of the identified resources in the low power mode mask to eliminate any of the low power resource modes, or any combination of the low power resource modes, that have a combined latency requirement that exceeds the latency budget;
means for determining potential power savings of each of the evaluated low power resource modes based upon a potential power savings per unit time at a current temperature times the determined expected idle time;
means for selecting a combination of the low power resource modes that maximizes the potential power savings and has a total latency requirement that is less than or equal to the latency budget; and
means for entering the selected combination of the low power resource modes by executing an enter function of each of the selected low power resource modes on each of the identified resources.

11. The computing device of claim 10, wherein means for selecting the combination of the low power resource modes further comprises means for executing a knapsack problem solution algorithm for the various low power resource modes and the resources.

12. The computing device of claim 10, wherein means for evaluating on the computing device the low power resource modes for each of the identified resources in the low power mode mask to eliminate any low power resource mode, or any combination of low power resource modes, that have the combined latency requirement that exceeds the latency budget comprises means for performing a table look up process using a low power mode selection data table using a potential power saving, an estimated idle time, and operating conditions.

13. The computing device of claim 12, wherein the operating conditions include a temperature value.

14. The computing device of claim 12, further comprising:
means for gathering statistics regarding the operating conditions on the computing device; and
means for updating the low power mode selection data table based upon the gathered operating conditions statistics.

15. The computing device of claim 14, wherein the operating conditions are selected from the group including temperature, power consumption of particular low power resource modes, idle times experienced in various operating states, and typical device usage patterns.

16. The computing device of claim 14, further comprising means for determining whether the computing device is connected to external power, wherein means for updating the low power mode selection data table based upon the operating conditions statistics is accomplish in response to determining the computing device is connected to the external power.

17. A computing device having at least one processor, the computing device comprising:
means for measuring, when the computing device is in a known stable state, temperature and current, or temperature and power demand;
means for selecting a resource for measurement;

means for placing the selected resource in a low power resource mode;

means for measuring current or power demand while the selected resource is in the low power resource mode;

means for repeating steps of selecting a next resource, placing the selected resource in a low power resource mode and measuring current or power demand while the selected resource is in the low power resource mode until current or power demand during a low power resource mode has been measured for all resources having a low power resource mode;

means for setting a flag bit associated with a resource in a low power mode mask when the resource is not in use, wherein the resource is one of a plurality of resources;

means for identifying the resources of the plurality of resources that may be placed in a low power resource mode based upon flag bit settings in the low power mode mask when the at least one processor is able to enter an idle state;

means for registering a latency requirement for each of the identified resources in the low power mode mask;

means for determining a latency budget for the computing device;

means for evaluating on the computing device low power resource modes for each of the identified resources in the low power mode mask to eliminate any of the low power resource modes, or any combination of the low power resource modes, that have a combined latency requirement that exceeds the latency budget;

means for using the measured current or power demand associated with each of the low power resource modes to determine potential power savings of a combination of the low power resource modes;

means for selecting a combination of the low power resource modes that maximizes the potential power savings and has a total latency requirement that is less than or equal to the latency budget; and means for entering the selected combination of the low power resource modes by executing an enter function of each of the selected low power resource modes on each of the identified resources.

18. The computing device of claim 17, further comprising:

means for repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 17 at different temperatures; and means for determining a temperature sensitivity of current or power demand associated with each of the low power resource modes, wherein means for selecting the combination of the low power resource modes that maximizes the potential power savings and has the total latency requirement that is less than or equal to the latency budget comprises:

means for measuring a temperature of the computing device; and means for selecting a combination of the low power resource modes that maximizes the potential power savings and has the total latency requirement that is less than or equal to the latency budget using the determined temperature sensitivity of current or power demand associated with each of the low power resource modes to determine potential power savings of the combination of the low power resource modes at the measured computing device temperature.

19. A computing device, comprising:

a memory; and a processor coupled to the memory, wherein the processor is configured with processor-executable instructions to perform operations comprising:

setting a flag bit associated with a resource in a low power mode mask when the resource is not in use, wherein the resource is one of a plurality of resources;

identifying the resources of the plurality of resources that may be placed in a low power resource mode based upon flag bit settings in the low power mode mask when the processor is able to enter an idle state;

registering a latency requirement for each of the identified resources in the low power mode mask;

determining a time that the processor is expected to remain in the idle state;

determining a latency budget for the computing device;

evaluating on the computing device low power resource modes for each of the identified resources in the low power mode mask to eliminate any of the low power resource modes, or any combination of the low power resource modes, that have a combined latency requirement that exceeds the latency budget;

determining potential power savings of each of the evaluated low power resource modes based upon a potential power savings per unit time at a current temperature times the determined expected idle time;

selecting a combination of the low power resource modes that maximizes the potential power savings that has a total latency requirement and is less than or equal to the latency budget; and entering the selected combination of the low power resource modes by executing an enter function of each of the selected low power resource modes on each of the identified resources.

20. The computing device of claim 19, wherein the processor is configured with processor-executable instructions that selecting the combination of the low power resource modes further comprises executing a knapsack problem solution algorithm for the various low power resource modes and the resources.

21. The computing device of claim 19, wherein the processor is configured with processor-executable instructions such that evaluating on the computing device low power resource modes for each of the identified resources in the low power mode mask to eliminate any of the low power resource modes, or any combination of the low power resource modes, that have a combined latency requirement that exceeds the latency budget is based at least in part on a table look up process using a low power mode selection data table using a potential power saving, an estimated idle time, and operating conditions.

22. The computing device of claim 21, wherein the processor is configured with processor-executable instructions such that the operating conditions include a temperature value.

23. The computing device of claim 21, wherein the processor is configured with processor-executable instructions to perform operations further comprising:

gathering statistics regarding operating conditions on the computing device; and updating the low power mode selection data table based upon the gathered operating conditions statistics.

24. The computing device of claim 23, wherein the processor is configured with processor-executable instructions such that the operating conditions are selected from the group including temperature, power consumption of particular low power resource modes, idle times experienced in various operating states, and typical device usage patterns.

25. The computing device of claim 23, wherein the processor is configured with processor-executable instructions to perform operations further comprising:
determining whether the computing device is connected to external power, and
wherein the processor is configured with processor-executable instructions to perform operations such that updating the low power mode selection data table based upon the operating conditions statistics is accomplish in response to determining the computing device is connected to the external power.

26. A computing device, comprising:
a memory; and
a processor coupled to the memory, wherein the processor is configured with processor-executable instructions to perform operations, comprising:
measuring, when the computing device is in a known stable state, temperature and current, or temperature and power demand;
selecting a resource for measurement;
placing the selected resource in a low power resource mode;
measuring current or power demand while the selected resource is in the low power resource mode;
repeating steps of selecting a next resource, placing the selected resource in a low power resource mode and measuring current or power demand while the selected resource is in the low power resource mode until current or power demand during a low power resource mode has been measured for all resources having a low power resource mode;
setting a flag bit associated with a resource in a low power mode mask when the resource is not in use, wherein the resource is one of a plurality of resources;
identifying the resources of the plurality of resources that may be placed in a low power resource mode based upon flag bit settings in the low power mode mask when the processor is able to enter an idle state;
registering a latency requirement for each of the identified resources in the low power mode mask;
using the measured current or power demand associated with each of the low power resource modes to determine potential power savings of a combination of the low power resource modes;
selecting a combination of the low power resource modes that maximizes the potential power savings and has a total latency requirement that is less than or equal to a latency budget; and
entering the selected combination of the low power resource modes by executing an enter function of each of the selected low power resource modes on each of the identified resources.

27. The computing device of claim 26, wherein the processor is configured with processor-executable instructions to perform operations further comprising:
repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 26 at different temperatures; and
determining a temperature sensitivity of current or power demand associated with each of the low power resource modes,
wherein the processor is configured with processor-executable instructions to perform operations such that selecting the combination of the low power resource modes that maximizes the potential power savings and has the total latency requirement that is less than or equal to the latency budget comprises:
measuring a temperature of the computing device; and
selecting a combination of the low power resource modes that maximizes the potential power savings and has the total latency requirement that is less than or equal to the latency budget using the determined temperature sensitivity of the current or the power demand associated with each of the low power resource modes to determine the potential power savings of the combination of the low power resource modes at the measured computing device temperature.

28. A non-transitory processor readable storage medium having stored thereon processor-executable instructions configured to cause a processor of a computing device to perform operations comprising:
setting a flag bit associated with a resource in a low power mode mask when the resource is not in use, wherein the resource is one of a plurality of resources;
identifying the resources of the plurality of resources that may be placed in a low power resource mode based upon flag bit settings in the low power mode mask when the processor is able to enter an idle state;
registering a latency requirement for each of the identified resources in the low power mode mask;
determining a time that the processor is expected to remain in the idle state;
determining a latency budget for the computing device;
evaluating on the computing device low power resource modes for each of the identified resources in the low power mode mask to eliminate any of the low power resource modes, or any combination of the low power resource modes, that have a combined latency requirement that exceeds the latency budget;
determining potential power savings of each of the evaluated low power resource modes based upon a potential power savings per unit time at a current temperature times the determined expected idle time;
selecting a combination of the low power resource modes that maximizes the potential power savings and has a total latency requirement that is less than or equal to the latency budget; and
entering the selected combination of the low power resource modes by executing an enter function of each of the selected low power resource modes on each of the identified resources.

29. The non-transitory processor readable storage medium of claim 28, wherein the stored processor-executable instructions are configured to cause the processor of the computing device to perform operations such that selecting the combination of the low power resource modes further comprises executing a knapsack problem solution algorithm for the various low power resource modes and the resources.

30. The non-transitory processor readable storage medium of claim 28, wherein the stored processor-executable instructions are configured to cause the processor of the computing device to perform operations such that evaluating on the computing device the low power resource modes for each of the identified resources in the low power mode mask is based at least in part on a table look up process using a low power mode selection data table using a potential power saving, an estimated idle time, and operating conditions.

31. The non-transitory processor readable storage medium of claim 30, wherein the stored processor-executable instructions are configured to cause the processor of the computing device to perform operations such that the operating conditions include a temperature value.

32. The non-transitory processor readable storage medium of claim 30, wherein the stored processor-executable instructions are configured to cause the processor of the computing device to perform operations further comprising:
gathering statistics regarding operating conditions on the computing device; and
updating the low power mode selection data table based upon the gathered operating conditions statistics.

33. The non-transitory processor readable storage medium of claim 32, wherein the stored processor-executable instructions are configured to cause the processor of the computing device to perform operations such that the operating conditions are selected from the group including temperature, power consumption of particular low power resource modes, idle times experienced in various operating states, and typical device usage patterns.

34. The non-transitory processor readable storage medium of claim 32, wherein the stored processor-executable instructions are configured to cause the processor of the computing device to perform operations further comprising:
determining whether the computing device is connected to external power, and
wherein the stored processor-executable instructions are configured to cause the processor of the computing device to perform operations such that updating the low power mode selection data table based upon the operating conditions statistics is accomplished in response to determining the computing device is connected to the external power.

35. A non-transitory processor readable storage medium having stored thereon processor-executable instructions configured to cause a processor of a computing device to perform operations comprising:
measuring, when the computing device is in a known stable state, temperature and current, or temperature and power demand;
selecting a resource for measurement;
placing the selected resource in a low power resource mode;
measuring current or power demand while the selected resource is in the low power resource mode;
repeating steps of selecting a next resource, placing the selected resource in a low power resource mode and measuring current or power demand while the selected resource is in the low power resource mode until current or power demand during a low power resource mode has been measured for all resources having a low power resource mode;
setting a flag bit associated with a resource in a low power mode mask when the resource is not in use, wherein the resource is one of a plurality of resources;
identifying the resources of the plurality of resources that may be placed in a low power resource mode based upon flag bit settings in the low power mode mask when the processor is able to enter an idle state;
registering a latency requirement for each of the identified resources in the low power mode mask;
using the measured current or power demand associated with each of the low power resource modes to determine potential power savings of a combination of the low power resource modes;
selecting a combination of the low power resource modes that maximizes the potential power savings and has a total latency requirement that is less than or equal to a latency budget; and
entering the selected combination of the low power resource modes by executing an enter function of each of the selected low power resource modes on each of the identified resources.

36. The non-transitory processor readable storage medium of claim 35, wherein the stored processor-executable instructions are configured to cause the processor of the computing device to perform operations further comprising:
repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 35 at different temperatures; and
determining a temperature sensitivity of current or power demand associated with each of the low power resource modes,
wherein the stored processor-executable instructions are configured to cause the processor of the computing device to perform operations such that selecting the combination of the low power resource modes that maximizes potential power savings and has the total latency requirement that is less than or equal to the latency budget comprises:
measuring a temperature of the computing device; and
selecting a combination of the low power resource modes that maximizes the potential power savings and has the total latency requirement that is less than or equal to the latency budget using the determined temperature sensitivity of current or power demand associated with each of the low power resource modes to determine potential power savings of the combination of the low power resource modes at the measured computing device temperature.

37. A method for conserving power in a computing device, comprising:
measuring, when the computing device is in a known stable state, temperature and current, or temperature and power demand;
selecting a resource for measurement;
placing the selected resource in a low power resource mode;

measuring current or power demand while the selected resource is in the low power resource mode;

repeating steps of selecting a next resource, placing the selected resource in a low power resource mode and measuring current or power demand while the selected resource is in the low power resource mode until current or power demand during a low power resource mode has been measured for all resources having a low power resource mode;

setting a flag bit associated with a resource when the resource is not in use, wherein the resource is one of a plurality of resources;

identifying the resources of the plurality of resources that may be placed in a low power resource mode based upon flag bit settings when a processor is able to enter an idle state;

registering a latency requirement for each of the identified resources;

selecting a most stringent latency requirement from the registered latency requirements;

evaluating on the computing device low power resource modes for each resource that may be placed in a low power resource mode to eliminate any of the low power resource modes, or any combination of the low power resource modes, that have a combined latency requirement that exceeds the selected most stringent latency requirement;

selecting, by the processor, a combination of the low power resource modes that maximizes a potential power savings and has a total latency requirement that is less than or equal to the selected most stringent latency requirement using the measured current or power demand associated with each of the low power resource modes to determine potential power savings of the combination of the low power resource modes; and entering the selected combination of the low power resource modes by executing an enter function of each of the selected low power resource modes on each of the identified resources.

38. The method of claim 37, further comprising:

repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 37 at different temperatures; and determining a temperature sensitivity of current or power demand associated with each of the low power resource modes, wherein selecting the combination of the low power resource modes that maximizes the potential power savings and has the total latency requirement that is less than or equal to the selected most stringent latency requirement using the measured current or power demand associated with each of the low power resource modes to determine the potential power savings of the combination of the low power resource modes comprises:

measuring a temperature of the computing device; and selecting a combination of the low power resource modes that maximizes the potential power savings and has the total latency requirement that is less than or equal to the selected most stringent latency requirement using the measured current or power demand associated with each of the low power resource modes and the determined temperature sensitivity of current or power demand associated with each of the low power resource modes to determine the potential power savings of the combination of the low power resource modes at the measured computing device temperature.

39. A method for conserving power in a computing device, comprising:

setting a flag bit associated with a resource when the resource is not in use, wherein the resource is one of a plurality of resources;

identifying the resources of the plurality of resources that may be placed in a low power mode based upon flag bit settings when a processor is able to enter an idle state;

registering a latency requirement for each of the identified resources;

selecting a most stringent latency requirement from the registered latency requirements;

evaluating, via a table look up process using a low power mode selection data table based on a potential power saving, an estimated idle time, and operating conditions, on the computing device low power resource modes for each resource that may be placed in a low power resource mode to eliminate any of the low power resource modes, or any combination of the low power resource modes, that have a combined latency requirement that exceeds the selected most stringent latency requirement;

selecting, by the processor, a combination of the low power resource modes that maximizes potential power savings and has a total latency requirement that is less than or equal to the selected most stringent latency requirement;

entering the selected combination of the low power resource modes by executing an enter function of each of the selected low power resource modes on each of the identified resources;

gathering statistics regarding operating conditions on the computing device;

determining whether the computing device is connected to external power; and updating the low power mode selection data table based upon the operating conditions statistics in response to determining the computing device is connected to the external power.

40. A computing device having at least one processor, comprising:

means for measuring, when the computing device is in a known stable state, temperature and current, or temperature and power demand;

means for selecting a resource for measurement;

means for placing the selected resource in a low power resource mode;

means for measuring current or power demand while the selected resource is in the low power resource mode;

means for repeating steps of selecting a next resource, placing the selected resource in a low power resource mode and measuring current or power demand while the selected resource is in the low power resource mode until current or power demand during a low power resource mode has been measured for all resources having a low power resource mode;

means for setting a flag bit associated with a resource when the resource is not in use, wherein the resource is one of a plurality of resources;

means for identifying the resources of the plurality of resources that may be placed in a low power mode based upon flag bit settings when the at least one processor is able to enter an idle state;

means for registering a latency requirement for each of the identified resources;

means for selecting a most stringent latency requirement from the registered latency requirements;

means for evaluating on the computing device low power resource modes for each resource that may be placed in a low power resource mode to eliminate any of the low power resource modes, or any combination of the low power resource modes, that have a combined latency requirement that exceeds the selected most stringent latency requirement;

means for selecting a combination of the low power resource modes that maximizes a potential power savings and has a total latency requirement that is less than or equal to the selected most stringent latency requirement using the measured current or power demand associated with each of the low power resource modes to determine potential power savings of the combination of the low power resource modes; and means for entering the selected combination of low power resource modes by executing an enter function of each of the selected low power resource modes on each of the identified resources.

41. The computing device of claim 40, further comprising:

means for repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 40 at different temperatures; and means for determining a temperature sensitivity of current or power demand associated with each of the low power resource modes, wherein means for selecting the combination of the low power resource modes that maximizes the potential power savings and has the total latency requirement that is less than or equal to the selected most stringent latency requirement using the measured current or power demand associated with each of the low power resource modes to determine potential power savings of the combination of the low power resource modes comprises:

means for measuring a temperature of the computing device; and means for selecting a combination of the low power resource modes that maximizes the potential power savings and has the total latency requirement that is less than or equal to the selected most stringent latency requirement using the measured current or power demand associated with each of the low power resource modes and the determined temperature sensitivity of current or power demand associated with each of the low power resource modes to determine potential power savings of the combination of the low power resource modes at the measured computing device temperature.

42. A computing device having at least one processor, comprising:

means for setting a flag bit associated with a resource when the resource is not in use, wherein the resource is one of a plurality of resources;

means for identifying the resources of the plurality of resources that may be placed in a low power resource mode based upon flag bit settings when the at least one processor is able to enter an idle state;

means for registering a latency requirement for each of the identified resources;

means for selecting a most stringent latency requirement from the registered latency requirements;

means for evaluating, via a table look up process using a low power mode selection data table based on a potential power saving, an estimated idle time, and operating conditions, on the computing device low power resource modes for each resource that may be placed in a low power resource mode to eliminate any of the low power resource modes, or any combination of the low power resource modes, that have a combined latency requirement that exceeds the selected most stringent latency requirement;

means for selecting a combination of the low power resource modes that maximizes a potential power savings and has a total latency requirement that is less than or equal to the selected most stringent latency requirement;

means for entering the selected combination of the low power resource modes by executing an enter function of each of the selected low power resource modes on each of the identified resources;

means for gathering statistics regarding operating conditions on the computing device;

means for determining whether the computing device is connected to external power; and means for updating the low power mode selection data table based upon the operating conditions statistics in response to determining the computing device is connected to the external power.

43. A computing device, comprising:

a memory; and a processor coupled to the memory, wherein the processor is configured with processor-executable instructions to perform operations comprising:

measuring, when the computing device is in a known stable state, temperature and current, or temperature and power demand;

selecting a resource for measurement;

placing the selected resource in a low power resource mode;

measuring current or power demand while the selected resource is in the low power resource mode;

repeating steps of selecting a next resource, placing the selected resource in a low power resource mode and measuring current or power demand while the selected resource is in the low power resource mode until current or power demand during a low power resource mode has been measured for all resources having a low power resource mode;

setting a flag bit associated with a resource when the resource is not in use, wherein the resource is one of a plurality of resources;

identifying the resources of the plurality of resources that may be placed in a low power resource mode based upon flag bit settings when the processor is able to enter an idle state;

registering a latency requirement for each of the identified resources;

selecting a most stringent latency requirement from the registered latency requirements;

evaluating on the computing device low power resource modes for each resource that may be placed in a low power resource mode to eliminate any of the low power resource modes, or any combination of the low power resource modes, that have a combined latency requirement that exceeds the selected most stringent latency requirement;

selecting a combination of the low power resource modes that maximizes a potential power savings and has a total latency requirement that is less than or equal to the selected most stringent latency requirement using the measured current or power demand associated with each of the low power resource modes to determine potential power savings of the combination of the low power resource modes; and entering the selected combination of low power resource modes by executing an enter function of each of the selected low power resource modes on each of the identified resources.

44. The computing device of claim 43, wherein the processor is configured with processor-executable instructions to perform operations further comprising:

repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 43 at different temperatures; and determining a temperature sensitivity of current or power demand associated with each of the low power resource modes, and wherein the processor is configured with processor-executable instructions to perform operations such that selecting the combination of the low power resource modes that maximizes the potential power savings and has total latency requirement that is less than or equal to the selected most stringent latency requirement using the measured current or power demand associated with each of the low power resource modes to determine the potential power savings of the combination of the low power resource modes comprises:

measuring a temperature of the computing device; and selecting a combination of low power resource modes that maximizes the potential power savings and has the total latency requirement that is less than or equal to the selected most stringent latency requirement using the measured current or power demand associated with each of the low power resource modes and the determined temperature sensitivity of current or power demand associated with each of the low power resource modes to determine the potential power savings of the combination of the low power resource modes at the measured computing device temperature.

45. A computing device, comprising:

a memory; and a processor coupled to the memory, wherein the processor is configured with processor-executable instructions to perform operations comprising:

setting a flag bit associated with a resource when the resource is not in use, wherein the resource is one of a plurality of resources;

identifying the resources of the plurality of resources that may be placed in a low power resource mode based upon flag bit settings when the processor is able to enter an idle state;

registering a latency requirement for each of the identified resources;

selecting a most stringent latency requirement from the registered latency requirements;

evaluating, via a table look up process using a low power mode selection data table based on a potential power saving, an estimated idle time, and operating conditions, on the computing device low power resource modes for each resource that may be placed in a low power resource mode to eliminate any of the low power resource modes, or any combination of the low power resource modes, that have a combined latency requirement that exceeds the selected most stringent latency requirement;

selecting a combination of the low power resource modes that maximizes a potential power savings and has a total latency requirement that is less than or equal to the selected most stringent latency requirement;

entering the selected combination of the low power resource modes by executing an enter function of each of the selected low power resource modes on each of the identified resources;

gathering statistics regarding operating conditions on the computing device;

determining whether the computing device is connected to external power; and updating the low power mode selection data table based upon the operating conditions statistics in response to determining the computing device is connected to the external power.

46. A non-transitory processor readable storage medium having stored thereon processor-executable instructions configured to cause a processor of a computing device to perform operations comprising:

measuring, when the computing device is in a known stable state, temperature and current, or temperature and power demand;

selecting a resource for measurement;

placing the selected resource in a low power resource mode;

measuring current or power demand while the selected resource is in the low power resource mode;

repeating steps of selecting a next resource, placing the selected resource in a low power resource mode and measuring current or power demand while the selected resource is in the low power resource mode until current or power demand during a low power resource mode has been measured for all resources having a low power resource mode;

setting a flag bit associated with a resource when the resource is not in use, wherein the resource is one of a plurality of resources;

identifying the resources of the plurality of resources that may be placed in a low power resource mode based upon flag bit settings when the processor is able to enter an idle state;

registering a latency requirement for each of the identified resources;

selecting a most stringent latency requirement from the registered latency requirements;

evaluating on the computing device low power resource modes for each resource that may be placed in a low power resource mode to eliminate any of the low power resource modes, or any combination of the low power resource modes, that have a combined latency requirement that exceeds the selected most stringent latency requirement;

selecting a combination of the low power resource modes that maximizes a potential power savings and has a total latency requirement that is less than or equal to the selected most stringent latency requirement using the measured current or power demand associated with each of the low power resource modes to determine potential power savings of the combination of the low power resource modes; and entering the selected combination of the low power resource modes by executing an enter function of each of the selected low power resource modes on each of the identified resources.

47. The non-transitory processor readable storage medium of claim 46, wherein the stored processor-executable instructions are configured to cause the processor of the computing device to perform operations further comprising:

repeating the operations of measuring temperature and current or temperature and power demand, selecting a resource for measurement, placing the selected resource in a low power resource mode, measuring current or power demand while the selected resource is in the low power resource mode, and repeating steps of selecting a next resource, placing the selected resource in a low power resource mode and measuring current or power demand while the selected resource is in the low power resource mode until current or power demand during a low power resource mode has been measured for all resources having a low power resource mode as recited in claim 46 at different temperatures; and determining a temperature sensitivity of current or power demand associated with each of the low power resource mode, wherein the stored processor-executable instructions are configured to cause the processor of the computing device to perform operations such that selecting the combination of the low power resource modes that maximizes the potential power savings and has the total latency requirement that is less than or equal to the selected most stringent latency requirement using the measured current or power demand associated with each of the low power resource modes to determine the potential power savings of the combination of the low power resource modes comprises:

measuring a temperature of the computing device; and selecting a combination of the low power resource modes that maximizes the potential power savings and has the total latency requirement that is less than or equal to the selected most stringent latency requirement using the measured current or power demand associated with each of the low power resource modes and the determined temperature sensitivity of current or power demand associated with each of the low power resource modes to determine potential power savings of the combination of the low power resource modes at the measured computing device temperature.

48. A non-transitory processor readable storage medium having stored thereon processor-executable instructions configured to cause a processor of a computing device to perform operations comprising:

setting a flag bit associated with a resource when the resource is not in use, wherein the resource is one of a plurality of resources;

identifying the resources of the plurality of resources that may be placed in a low power mode based upon flag bit settings when the processor is able to enter an idle state;

registering a latency requirement for each of the identified resources;

selecting a most stringent latency requirement from the registered latency requirements;

evaluating, via a table look up process using a low power mode selection data table based on a potential power saving, an estimated idle time, and operating conditions, on the computing device low power resource modes for each resource that may be placed in a low power resource mode to eliminate any of the low power resource modes, or any combination of the low power resource modes, that have a combined latency requirement that exceeds the selected most stringent latency requirement;

selecting a combination of the low power resource modes that maximizes the potential power savings and has a total latency requirement that is less than or equal to the selected most stringent latency requirement;

entering the selected combination of the low power resource modes by executing an enter function of each of the selected low power resource modes on each of the identified resources;

gathering statistics regarding operating conditions on the computing device;

determining whether the computing device is connected to external power; and updating the low power mode selection data table based upon the operating conditions statistics in response to determining the computing device is connected to the external power.

49. A method for conserving power in a computing device, comprising:

setting a flag bit associated with a resource in a low power mode mask when the resource is not in use, wherein the resource is one of a plurality of resources;

identifying the resources of the plurality of resources that may be placed in a low power resource mode based upon flag bit settings in the low power mode mask when a processor of the computing device is able to enter an idle state;

registering a latency requirement for each of the identified resources in the low power mode mask;

determining a latency budget for the computing device;

evaluating on the computing device low power resource modes for each identified resource in the low power mode mask to eliminate any of the low power resource modes, or any combination of the low power resource modes, that have a combined latency requirement that exceeds the latency budget;

selecting, by the processor, a combination of the low power resource modes that maximizes a potential power savings and has a total latency requirement that is less than or equal to the latency budget using a temperature sensitivity of current or power demand associated with each of the low power resource modes to determine potential power savings of a combination of the low power resource modes at a measured computing device temperature; and entering the selected combination of the low power resource modes by executing an enter function of each of the selected low power resource modes on each of the identified resources.

50. A computing device having at least one processor, comprising:

means for setting a flag bit associated with a resource in a low power mode mask when the resource is not in use, wherein the resource is one of a plurality of resources;

means for identifying the resources of the plurality of resources that may be placed in a low power resource mode based upon flag bit settings in the low power mode mask when the at least one processor is able to enter an idle state;

means for registering a latency requirement for each of the identified resources in the low power mode mask;

means for determining a latency budget for the computing device;

means for evaluating on the computing device low power resource modes for each identified resource in the low power mode mask to eliminate any of the low power resource modes, or any combination of the low power resource modes, that have a combined latency requirement that exceeds the latency budget;

means for selecting a combination of the low power resource modes that maximizes a potential power savings and has a total latency requirement that is less than or equal to the latency budget using a temperature sensitivity of current or power demand associated with each of the low power resource modes to determine potential power savings of a combination of the low power resource modes at a measured computing device temperature; and means for entering the selected combination of the low power resource modes by executing an enter function of each of the selected low power resource modes on each of the identified resources.

51. A computing device, comprising:

a memory; and a processor coupled to the memory, wherein the processor is configured with processor-executable instructions to perform operations comprising:

setting a flag bit associated with a resource in a low power mode mask when the resource is not in use, wherein the resource is one of a plurality of resources;

identifying the resources of the plurality of resources that may be placed in a low power resource mode based upon flag bit settings in the low power mode mask when the processor is able to enter an idle state;

registering a latency requirement for each of the identified resources in the low power mode mask;

determining a latency budget for the computing device;

evaluating on the computing device low power resource modes for each identified resource in the low power mode mask to eliminate any of the low power resource modes, or any combination of the low power resource modes, that have a combined latency requirement that exceeds the latency budget;

selecting a combination of the low power resource modes that maximizes a potential power savings and has a total latency requirement that is less than or equal to the latency budget using a temperature sensitivity of current or power demand associated with each of the low power resource modes to determine potential power savings of a combination of the low power resource modes at a measured computing device temperature; and entering the selected combination of the low power resource modes by executing an enter function of each of the selected low power resource modes on each of the identified resources.

52. A non-transitory processor readable storage medium having stored thereon stored processor-executable instructions configured to cause a processor of a computing device to perform operations comprising:

setting a flag bit associated with a resource in a low power mode mask when the resource is not in use, wherein the resource is one of a plurality of resources;

identifying the resources of the plurality of resources that may be placed in a low power resource mode based upon flag bit settings in the low power mode mask when the processor is able to enter an idle state;

registering a latency requirement for each of the identified resources in the low power mode mask;

determining a latency budget for the computing device;

evaluating on the computing device low power resource modes for each identified resource in the low power mode mask to eliminate any of the low power resource modes, or any combination of the low power resource modes, that have a combined latency requirement that exceeds the latency budget;

selecting a combination of the low power resource modes that maximizes a potential power savings and has a total latency requirement that is less than or equal to the latency budget using a temperature sensitivity of current or power demand associated with each of the low power resource modes to determine potential power savings of a combination of the low power resource modes at a measured computing device temperature; and entering the selected combination of the low power resource modes by executing an enter function of each of the selected low power resource modes on each of the identified resources.

53. A method for conserving power in a computing device, comprising:

setting a flag bit associated with a resource in a low power mode mask when the resource is not in use, wherein the resource is one of a plurality of resources;

identifying the resources of the plurality of resources that may be placed in a low power resource mode based upon flag bit settings in the low power mode mask when a processor of the computing device is able to enter an idle state;

registering a latency requirement for each of the identified resources in the low power mode mask;

determining a latency budget for the computing device;

evaluating, based at least in part on a table look up process using a low power mode selection data table using a potential power saving, an estimated idle time, and operating conditions, on the computing device low power resource modes for each identified resource in the low power mode mask to eliminate any of the low power resource modes, or any combination of the low power resource modes, that have a combined latency requirement that exceeds the latency budget;

selecting, by the processor, a combination of the low power resource modes that maximizes potential power savings and has a total latency requirement that is less than or equal to the latency budget;
entering the selected combination of the low power resource modes by executing an enter function of each of the selected low power resource modes on each of the identified resources;
gathering statistics regarding operating conditions on the computing device;
determining whether the computing device is connected to external power; and
updating the low power mode selection data table based upon the gathered operating conditions statistics in response to determining the computing device is connected to the external power.

54. A computing device having at least one processor, comprising:
means for setting a flag bit associated with a resource in a low power mode mask when the resource is not in use, wherein the resource is one of a plurality of resources;
means for identifying the resources of the plurality of resources that may be placed in a low power resource mode based upon flag bit settings in the low power mode mask when the at least one processor is able to enter an idle state;
means for registering a latency requirement for each of the identified resources in the low power mode mask;
means for determining a latency budget for the computing device;
means for evaluating, based at least in part on a table look up process using a low power mode selection data table using a potential power saving, an estimated idle time, and operating conditions, on the computing device low power resource modes for each identified resource in the low power mode mask to eliminate any of the low power resource modes, or any combination of the low power resource modes, that have a combined latency requirement that exceeds the latency budget;
means for selecting a combination of the low power resource modes that maximizes potential power savings and has a total latency requirement that is less than or equal to the latency budget;
means for entering the selected combination of the low power resource modes by executing an enter function of each of the selected low power resource modes on each of the identified resources;
means for gathering statistics regarding operating conditions on the computing device;
means for determining whether the computing device is connected to external power; and
means for updating the low power mode selection data table based upon the gathered operating conditions statistics in response to determining the computing device is connected to the external power.

55. A computing device, comprising:
a memory; and
a processor coupled to the memory, wherein the processor is configured with processor-executable instructions to perform operations comprising:
setting a flag bit associated with a resource in a low power mode mask when the resource is not in use, wherein the resource is one of a plurality of resources;
identifying the resources of the plurality of resources that may be placed in a low power resource mode based upon flag bit settings in the low power mode mask when the processor is able to enter an idle state;
registering a latency requirement for each of the identified resources in the low power mode mask;
determining a latency budget for the computing device;
evaluating, based at least in part on a table look up process using a low power mode selection data table using a potential power saving, an estimated idle time, and operating conditions, on the computing device low power resource modes for each identified resource in the low power mode mask to eliminate any of the low power resource modes, or any combination of the low power resource modes, that have a combined latency requirement that exceeds the latency budget;
selecting a combination of the low power resource modes that maximizes potential power savings and has a total latency requirement that is less than or equal to the latency budget;
entering the selected combination of the low power resource modes by executing an enter function of each of the selected low power resource modes on each of the identified resources;
gathering statistics regarding operating conditions on the computing device;
determining whether the computing device is connected to external power; and
updating the low power mode selection data table based upon the gathered operating conditions statistics in response to determining the computing device is connected to the external power.

56. A non-transitory processor readable storage medium having stored thereon processor-executable instructions configured to cause a processor of a computing device to perform operations comprising:
setting a flag bit associated with a resource in a low power mode mask when the resource is not in use, wherein the resource is one of a plurality of resources;
identifying the resources of the plurality of resources that may be placed in a low power resource mode based upon flag bit settings in the low power mode mask when the processor is able to enter an idle state;
registering a latency requirement for each of the identified resources in the low power mode mask;
determining a latency budget for the computing device;
evaluating, based at least in part on a table look up process using a low power mode selection data table using a potential power saving, an estimated idle time, and operating conditions, on the computing device low power resource modes for each identified resource in the low power mode mask to eliminate any of the low power resource modes, or any combination of the low power resource modes, that have a combined latency requirement that exceeds the latency budget;
selecting a combination of the low power resource modes that maximizes potential power savings and has a total latency requirement that is less than or equal to the latency budget;
entering the selected combination of the low power resource modes by executing an enter function of each of the selected low power resource modes on each of the identified resources;
gathering statistics regarding operating conditions on the computing device;
determining whether the computing device is connected to external power; and
updating the low power mode selection data table based upon the gathered operating conditions statistics in response to determining the computing device is connected to the external power.

* * * * *